(12) United States Patent
Srinivas et al.

(10) Patent No.: US 9,689,887 B1
(45) Date of Patent: Jun. 27, 2017

(54) FALL EVENT MONITORING

(71) Applicant: Amazon Technologies, Inc., Reno, NV (US)

(72) Inventors: Vikram Srinivas, Seattle, WA (US); Ali-Reza Bahmandar, Seattle, WA (US); Ramez Nachman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 685 days.

(21) Appl. No.: 13/801,716

(22) Filed: Mar. 13, 2013

Related U.S. Application Data

(60) Provisional application No. 61/734,781, filed on Dec. 7, 2012.

(51) Int. Cl.
| | | |
|---|---|---|
| *G01P 15/08* | (2006.01) | |
| *G01P 15/00* | (2006.01) | |
| *G01B 21/18* | (2006.01) | |
| *G01C 15/00* | (2006.01) | |
| *G01P 13/00* | (2006.01) | |
| *G01P 15/14* | (2013.01) | |
| *G01P 15/18* | (2013.01) | |

(52) U.S. Cl.
CPC ............. *G01P 15/00* (2013.01); *G01B 21/18* (2013.01); *G01C 15/00* (2013.01); *G01P 13/00* (2013.01); *G01P 15/0891* (2013.01); *G01P 15/14* (2013.01); *G01P 15/18* (2013.01)

(58) Field of Classification Search
CPC .................. G01C 15/0211; G01P 15/0891
USPC ........................................... 702/141
See application file for complete search history.

(56) References Cited

U.S. PATENT DOCUMENTS

| | | | |
|---|---|---|---|
| 7,827,420 B2 * | 11/2010 | Wong et al. .................. 713/300 |
| 2007/0223123 A1 * | 9/2007 | Karakas .......................... 360/31 |
| 2010/0062833 A1 * | 3/2010 | Mattice ................ G11B 19/043 463/24 |
| 2013/0054180 A1 * | 2/2013 | Barfield .............. G01P 15/0891 702/138 |

* cited by examiner

*Primary Examiner* — Bryan Bui
(74) *Attorney, Agent, or Firm* — Lee & Hayes, PLLC

(57) ABSTRACT

In some examples, a portable electronic device may monitor onboard sensor information to detect and characterize a fall event. For example, the device may receive acceleration information from one or more accelerometers for determining that the device is falling, and may receive information from one or more gyroscopes for determining an orientation of the device. Based at least in part on the sensor information, the device may determine the fall duration, an estimated fall height, device orientation before during and after the fall, and/or a coefficient of restitution resulting from the device impacting a surface. The device may store the fall information on the device. Further, in some examples, the device may send the fall information to a remote computing device, which may aggregate the fall information from a plurality of the devices, such as for improving or optimizing the design of the devices.

21 Claims, 14 Drawing Sheets

|  | HEIGHT (mm) | DURATION OF FALL (milliseconds) | PREDICTED HEIGHT (mm) | ERROR % |
|---|---|---|---|---|
| STRAIGHT EDGE (LOW DRAG) | 1000 | 330 | 989 | 1.08 |
|  | 800 | 310 | 858 | 7.23 |
|  | 600 | 250 | 559 | 6.67 |
|  | 400 | 200 | 392 | 2.06 |
|  | 200 | 110 | 206 | 3.16 |
| FACE DROP (HIGH DRAG) | 1000 | 329 | 982 | 1.78 |
|  | 800 | 297 | 782 | 2.25 |
|  | 600 | 273 | 659 | 9.84 |
|  | 400 | 211 | 424 | 5.93 |
|  | 200 | 125 | 230 | 14.80 |

FIG. 9

FALL EVENT MONITORING

CROSS-REFERENCE TO RELATED APPLICATION

This application claims the benefit of U.S. Provisional Patent Application No. 61/734,781, filed Dec. 7, 2012, which is incorporated by reference herein in its entirety.

BACKGROUND

People use handheld, mobile or other portable electronic devices for a variety of purposes, such as making telephone calls, texting, accessing the Internet, sending and receiving email, viewing, playing or consuming digital content, executing applications, playing games, navigation, and numerous other functions. Users of these portable devices may sometimes drop their devices. These fall events can induce severe mechanical loads on a device, such as by inflicting high deformation loads on the external and internal subassemblies. Further, many fall events can be difficult to replicate due to their dynamic nature and the unknown orientations of the devices during impact. Thus, efforts are made to design portable devices to withstand impacts caused by falls, but such efforts are not always successful and/or can result in over-designing some features of these devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 9 is a table illustrating examples of freefall durations for various actual drop heights versus predicted drop heights according to some implementations.

DETAILED DESCRIPTION

Figure 1:
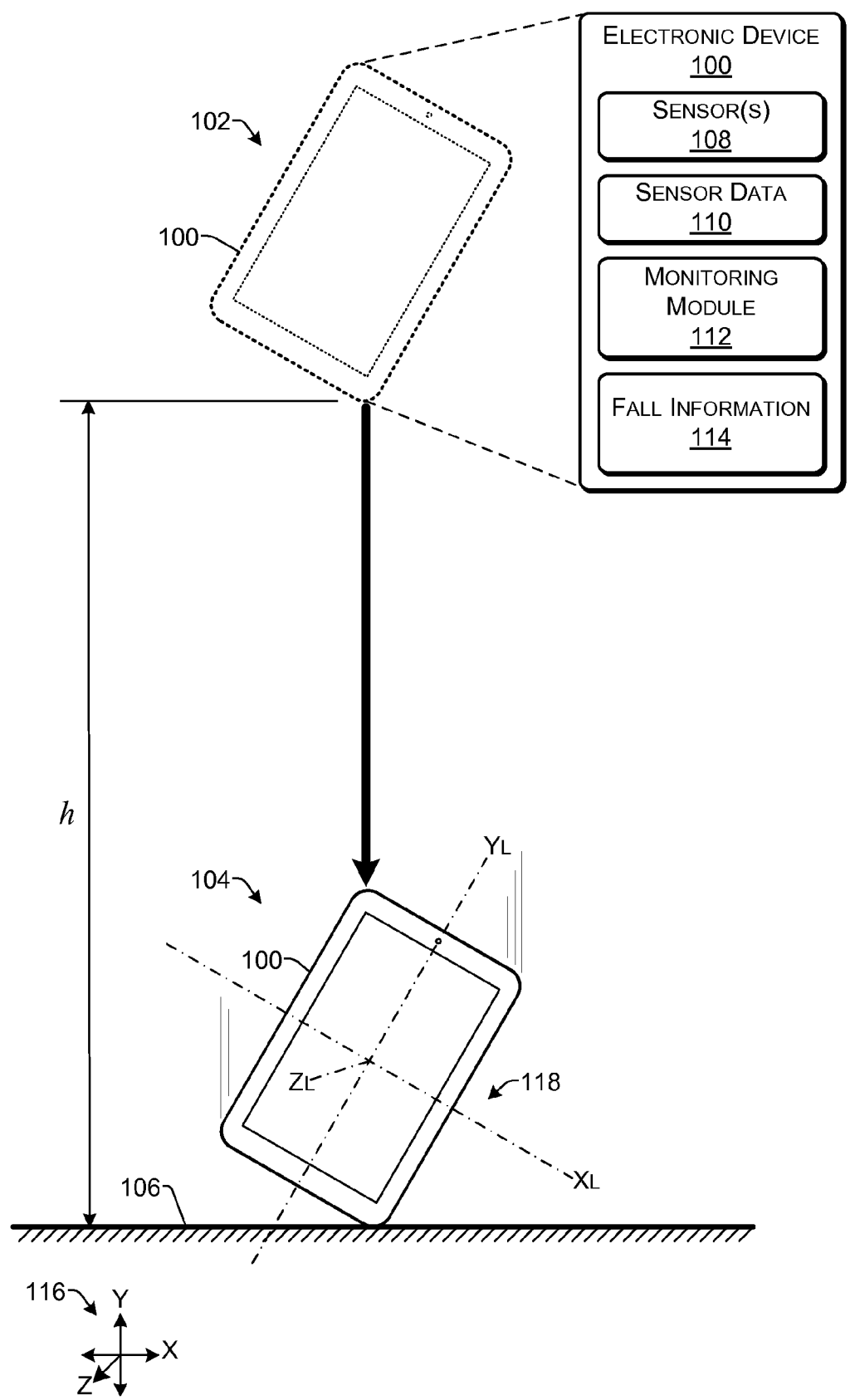
FIG. 1 illustrates an example portable electronic device able to monitor a fall event according to some implementations.

This disclosure describes techniques and arrangements for monitoring and characterizing falls that may be incurred by a portable electronic device. Examples of such falls or fall events may include drop events or freefall events, such as when a device is dropped, and projectile motion events, such as when a device is thrown or propelled. In some implementations, sensor data from built-in or onboard sensors, such as from one or more accelerometers and/or gyroscopes incorporated into the electronic device may provide acceleration and orientation information, respectively, before, during and following a fall. For instance, the sensors may be used to determine when the electronic device is in freefall and the occurrence of other nonstandard motion or acceleration conditions indicating that the device is falling. The collected sensor information may be used to determine whether the electronic device is experiencing or experienced a fall event, the duration of the fall event, the height of the fall event and/or an orientation of the electronic device during the fall event, such as at a time of impact with a surface. Further, in some examples, the sensor data may be used to determine a coefficient of restitution of the electronic device following the fall (e.g., how the device responds to impacting a surface), which can indicate the nature of the surface impacted by the device during the fall. The fall event information may be stored on the portable electronic device and/or sent to another computing device.

In the case that the electronic device does not functionally survive the fall, the fall information may be extracted at a later point in time, such as during servicing of the electronic device. In other examples in which the electronic device does functionally survive the fall, the electronic device may determine characteristics of the fall, such as height, orientation and coefficient of restitution, and store these parameters with the fall information. Further, the electronic device may provide the fall information to a remote computing device, such as over a network. For example, the electronic device may transmit the stored fall information to the computing device immediately after a fall event occurs, on a periodic basis, or after a threshold number of fall events have occurred. As another example, the fall information may be sent by the electronic device when the electronic device contacts a service provider, such as during synchronization of other content or information on the electronic device with the service provider. The fall information received by the computing device may be used for improving the design of the electronic device, determining whether servicing of a particular electronic device is recommended, and for various other testing and analysis purposes. For instance, some implementations may provide a design integrity team with realistic user-drop scenarios based on collection, aggregation and comparison of fall event data from a large number of user devices.

The implementations herein may employ built-in or onboard sensors already existing in an electronic device to detect fall events and record device orientations before, during and after a fall. In some examples, the electronic device may deploy a protective mechanism upon detecting that the electronic device is falling, such as for slowing the fall or protecting against impact. Additionally, the sensor data may be used to generate a histogram of fall orientations and fall heights of a typical electronic device while the electronic device is in use, and may enable differentiation in drop test specifications for different product categories.

Additionally, in some examples the techniques herein may be used for verifying the accuracy of drop test apparatuses, such as conventional drop test apparatuses, tumble test apparatuses, various drop testing techniques, and so forth. For instance, some implementations may enable characterization of the ability of a drop test apparatus to achieve a desired orientation of an electronic device during a drop test, and may further enable validation of drop test apparatus modifications or improvements. Some implementations enable modeling of a failure rate according fall orientation, along with a probability of occurrence of the corresponding fall orientation. Furthermore, some implementations may enable field studies with in-situ processing and saving of logs and diagnostics without significantly affecting the performance of the electronic device.

For discussion purposes, some examples are described in the environment of detecting a fall event that occurs to a portable electronic device. However, the implementations herein are not limited to the particular examples provided, and may be extended to other types of events, other types of electronic devices, and so forth, as will be apparent to those of skill in the art in light of the disclosure herein.

FIG. 1 depicts an example electronic device 100 able to monitor and characterize a fall event according to some implementations. The electronic device 100 may be a user-transportable device, a mobile device, or other portable device, and may be implemented as any of a number of different types of electronic devices, such as a cellphone, a smart phone, a tablet computing device, an electronic book (eBook) reader device, a media player, a navigation device, a portable gaming device, a laptop computer, or other typically handheld devices. Additionally, in some examples, the electronic device 100 may be a wearable device or a device that is otherwise transported by a user, such as headphones, a helmet, augmented reality glasses, an article of clothing, a device retained in an armband or supported on a belt, a watch, a bracelet, an anklet, or any other portable or mobile electronic device having components capable of performing the monitoring function described herein, and that may be moved by, carried by, worn by, or supported by a person.

In the example of FIG. 1, the device 100 may be dropped, may be thrown, or otherwise may fall a height h from a first position 102 to a second position 104. In some cases, the electronic device 100 may contact or impact a surface 106 at the second position 104, such as a surface of a floor, a surface of the ground, or a surface of an object, such as a thing, a person, or any other object. Further, in some examples, the impact with the surface 106 may be a glancing or oblique contact, rather than at a normal angle to the surface 106. The electronic device 100 may include sensors 108, such as one or more accelerometers, one or more gyroscopes, and/or various other sensors and components that may provide sensor data 110 to a monitoring module 112 on the electronic device 100. For example, the sensor data 110 may indicate an orientation of the electronic device 100 and/or whether the electronic device 100 is in motion or undergoing acceleration. When a fall event occurs, the monitoring module 112 may use the sensor data 110 obtained from the sensors 108 to store or generate fall information 114. For example, the fall information 114 may indicate the height h of the fall event and an attitude or orientation of the electronic device 100 before during and after the fall event.

As one example, based on the sensor data 110, the monitoring module 112 may detect a current orientation of the electronic device 100 and or acceleration of the electronic device 100 with respect to a coordinate system 116. In this example, the coordinate system 116 may be a global coordinate system in which a y-axis Y corresponds to gravity of the Earth, and an x-axis X and a z-axis Z are perpendicular to the y-axis Y and each other. The electronic device 100 may have a device local coordinate system 118 that includes a local y-axis YL, a local x-axis XL and a local z-axis ZL. Thus, based on the sensor data 110 from the sensors 108, the monitoring module 112 may determine the attitude or orientation of the device's local coordinate system 118 relative to the global coordinate system 116. Furthermore, while example coordinate systems are described herein for convenience of discussion, in other examples, any suitable frame of reference may be employed for determining an orientation of the electronic device 100.

In some examples, the electronic device 100 may use any combination of the inputs from multiple different sensors 108 for detecting that the electronic device 100 is in a type of motion or other condition that characterizes a fall. For instance, as discussed below, certain acceleration characteristics detected by an accelerometer and or rotational characteristics detected by gyroscope may indicate freefall or projectile motion conditions. Further, the electronic device 100 may allow some sensors, such as the accelerometer and/or gyroscope, to operate in the background at a low sampling rate until some type of movement indicative of a fall is detected by the sensors operating in the background. When the sensors provide sensor data that is indicative of a possible fall event, the monitoring module 112 may increase the sampling rate of the sensors 108 to collect a larger amount of data regarding the possible fall event. Thus, the monitoring module 112 may capture and store the sensor data 110 for the fall event as a portion of the fall information 114. Furthermore, as discussed additionally below, should the electronic device 100 survive the fall functionally intact, the monitoring module 112 may calculate the height h of the fall, a coefficient of restitution resulting from the fall, an orientation of the electronic device 100 during the fall and on impact with the surface 106, and various other fall information 114 related to the fall event.

Figure 2:
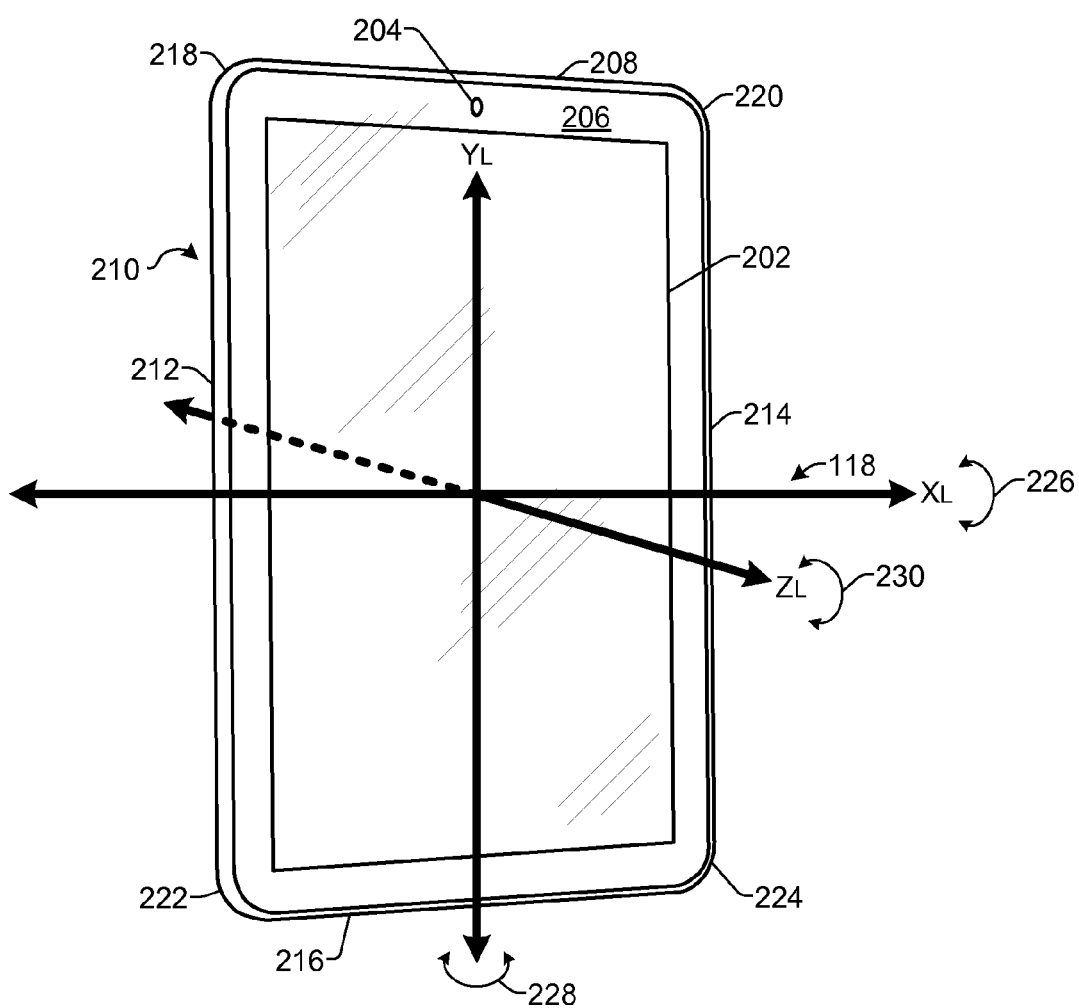
FIG. 2 illustrates an example device orientation according to some implementations.

FIG. 2 illustrates an enlarged perspective view of the example electronic device 100 and the device local coordinate system 118 according to some implementations. In this example, for convenience of discussion, the device coordinate system 118 corresponds to the respective x, y and z centerlines of the electronic device 100; however, the device local coordinate system 118 may be anchored at any other suitable point relative to the electronic device 100. Further, in this example, to provide illustrative reference points, the electronic device 100 may include a display 202, such as to present information to a user, and a camera 204. However, implementations herein are not limited to any particular type or configuration of the electronic device 100 and, thus, may include electronic devices 100 without a display or camera, electronic devices 100 having a display or camera in different locations or different configurations and so forth. Furthermore, the electronic device 100 may include various external controls and input devices that are not shown in this example. For instance, some implementations of the electronic device 100 may include a physical keyboard or keypad, a mouse, a pointing stick, a touchpad, a trackball, a joystick, a remote control, buttons and/or various other controls for performing various desired inputs and interactions with the electronic device 100. Thus, implementations are not limited to the electronic device 100 shown in FIG. 1, but may include any of the electronic devices described herein.

In the illustrated example, the display 202 is located on a face of the electronic device 100, referred to hereafter as a front side 206, and the camera 204 is located on the front side 206 near to a top side 208 of the electronic device 100. The electronic device 100 further includes a back side 210 opposite to the front side 206, a left side 212, a right side 214, an upper left corner 218, an upper right corner 220, a lower left corner 222 and a lower right corner 224. Any of these parts of the electronic device 100, or adjacent combinations of some parts, may be a location or point of impact during a fall event.

The sensors on the electronic device 100 may include one or more accelerometers and one or more gyroscopes incorporated into the functional components of the electronic device 100. Conventionally, the onboard accelerometer(s) and gyroscope(s) of an electronic device 100 act as supplementary input devices to determine orientation of the electronic device 100. For instance, the input from these sensors is typically used for orienting or reorienting a displayed image, e.g., to switch between landscape and portrait modes of the display, or as an input to navigate in some applications, such as games.

The one or more onboard accelerometers measure forces caused by an acceleration on the electronic device 100. Based on the forces applied along the device local x, y and z axes, implementations herein estimate the acceleration experienced by the electronic device 100 along these three axes. For example, acceleration Ay in the y-axis direction equals the force applied in the y-axis direction divided by the mass of the electronic device 100. Similarly, the acceleration Ax in the x-axis direction equals the force applied in the x-axis direction divided by the mass of the electronic device 100, and the acceleration Az in the z-axis direction equals the force applied in the z-axis direction divided by the mass of the electronic device 100. In some examples, the readout of an accelerometer in SI units is meters per second squared. The orientation of the electronic device 100 will determine which axis of the accelerometer will sense gravity. Accordingly, implementations herein do not employ any single axis of acceleration, but instead use an acceleration vector sum of all three axes.

Furthermore, a gyroscope typically measures angular velocity about each of the three axes of the coordinate system. For instance, a gyroscope may measure a pitch 226 about the x-axis, a roll 228 about the y-axis and a yaw 230 about the z-axis. The orientation of the electronic device 100 may not be directly determined from these measurements; however, these values may be integrated over time to determine a change in orientation from a known orientation. Furthermore, while temperature-based drift may be an issue with some gyroscope data, this can be compensated with onboard temperature sensors or other techniques. In some examples, a rotation matrix may be used for determining device orientation. For example, pitch 226, i.e., rotation about the x-axis XL, may have a positive value when the z-axis moves toward the y-axis. As one example, a bound of −180 to 180 may capture the orientations about the x-axis based on the knowledge of whether the display 202 is facing toward or away from the surface of impact. Similarly, roll 228, i.e., rotation about the y-axis, may have a positive value when the x-axis moves toward the z-axis, and yaw 230, i.e., rotation about the z-axis, may have a positive value when the x-axis moves towards the y-axis. Accordingly, the measured roll, pitch and/or yaw of the electronic device 100 may be used to determine the orientation of the electronic device 100 when the electronic device 100 impacts a surface 106, such as discussed above with respect to FIG. 1.

Figure 3:
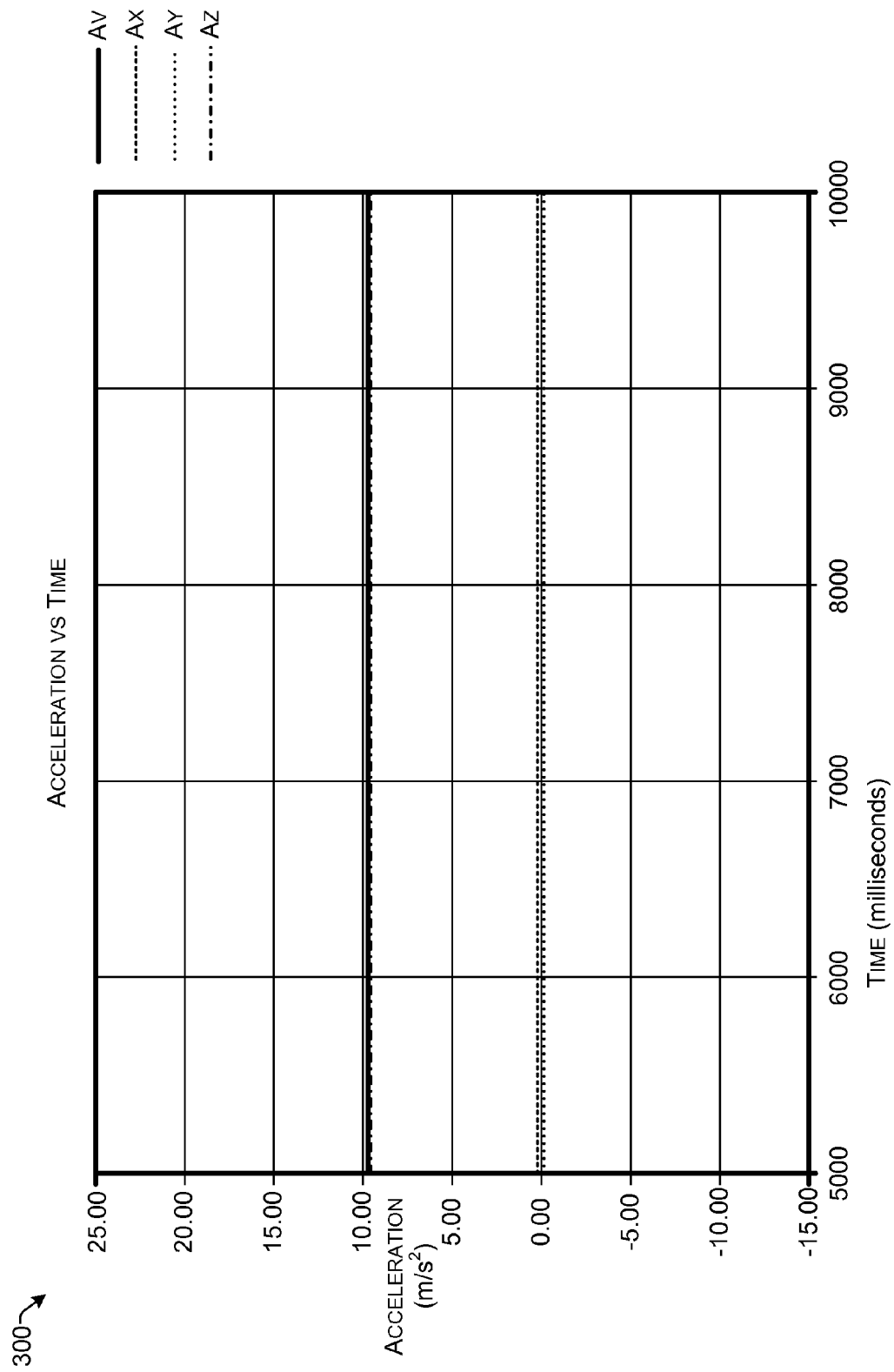
FIG. 3 is an example graph illustrating acceleration information for multiple axes and a corresponding acceleration vector sum according to some implementations.

FIG. 3 illustrates an example graph 300 showing acceleration information collected by an accelerometer on multiple axes and a corresponding acceleration vector sum Av according to some implementations. In this example, the electronic device 100 may be at rest, such as lying on the back side or front side of the electronic device on a table or other horizontal surface. In this example, the accelerometer readouts Ax and Ay along the x-axis and the y-axis, respectively, are close to 0 m/s$^2$, and the accelerometer readout Az along the z-axis shows the acceleration effect due to gravity (e.g., 9.81 m/s$^2$) on the electronic device 100. Accordingly, if the electronic device 100 were placed on the horizontal surface with a different orientation, such as standing on an edge, then a different axis of the accelerometer would show the acceleration due to gravity, e.g., the x-axis component Ax or the z-axis component Az. Furthermore, when the electronic device 100 is at an orientation other than horizontal on two or three axes, then multiple axes may show an acceleration greater than zero. Accordingly, to fully capture the acceleration forces having an effect on the electronic device 100 along all three axes, the vector sum of the acceleration may be determined, as illustrated by Av in the graph 300. Thus, the acceleration vector Av is the magnitude or total sum of the three acceleration components Ax, Ay and Az at any point in time.

When dynamically capturing fall events, a higher sampling rate for obtaining data from the sensors (e.g., greater than 100 KHz) can provide more accurate fall information than lower sampling rates. Typical drop tests on electronic devices 100 generate high impact accelerations at different locations on the electronic devices 100, ranging from a few hundred m/s$^2$ to thousands of m/s2. This translates to between tens and hundreds of Gs with very short pulse durations. However, such information only provides information on local responses to a fall and is often difficult to translate to actual overall device loads. The built-in or onboard sensors employed according to the implementations herein, on the other hand, typically have limited capabilities with lower ranges of sensitivity (e.g., ±2 Gs to ±10 Gs) and with sampling rates at lower frequencies (e.g., <100 Hz). Consequently, the onboard sensors used in typical electronic devices 100 are not of sufficient sensitivity to capture the peak acceleration loads experienced during dynamic events such as at the point of impact, but are still able to provide sufficient data for determining fall information, such as the orientation of the electronic device and the height of a fall as discussed according to the implementations herein.

In addition, dynamic events with short impact pulses can influence the onboard sensor readings and cause drastic changes in very short pulses (e.g., <10 milliseconds). Therefore, the sensor data collected from the sensors may be smoothed to increase the confidence in the data. For example, with a sampling frequency of 100 Hz, the acceleration values collected by the sensors may be aliased. Consequently, only certain aspects of the raw data may be accurate. Therefore, any suitable conventional smoothing or filtering algorithm may be used to smooth or filter out outliers in the collected sensor data and thereby increase the overall accuracy of the calculated acceleration vector sum. Several examples of suitable smoothing algorithms include linear smoothing filters and the moving average algorithm.

Figure 4:
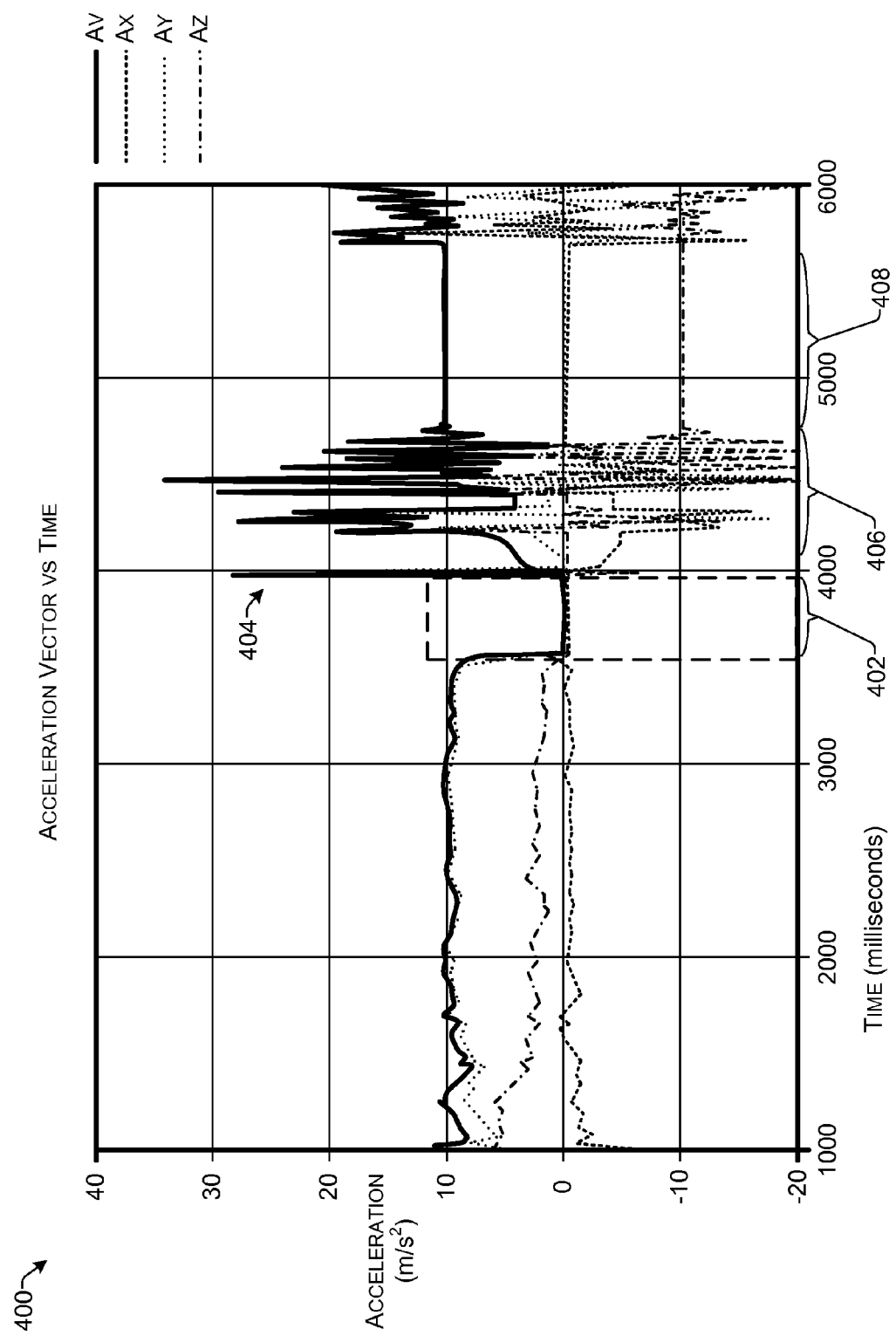
FIG. 4 is an example graph illustrating an acceleration vector versus time for a fall event according to some implementations.

FIG. 4 is a graph 400 illustrating an example of an acceleration vector versus time for a fall event according to some implementations. Accordingly, the graph 400 represents a freefall acceleration vector signature that is detectable from the sensor data and indicative of a freefall event. As shown in this example, during freefall, the acceleration vector Av tends toward zero. Accordingly, freefall in this example occurs between approximately 3500 milliseconds and 4000 milliseconds, as indicated by the dashed-line block at 402. The duration of the freefall can be used to estimate the height h of the fall, as discussed above with respect to FIG. 1 and as discussed additionally below.

Further, as indicated at 404, the acceleration vector Av spikes between about 4000 milliseconds and 4050 milliseconds as a result of the electronic device impacting a surface. As mentioned above, the magnitude of the acceleration vector Av in the graph 400 may not reflect the true instantaneous acceleration values experienced by the electronic device 100 at impact due to factors such as limitations on the sensitivity of the onboard accelerometer and the sampling rate. In addition, as indicated at 406, between 4100 milliseconds and 4800 milliseconds the acceleration components Ax, Ay and Az along the various different axes may also be the result of rotational moments, as discussed additionally below, and may indicate a coefficient of restitution. For instance, the acceleration information at 404 and 406 may indicate a coefficient of restitution of the electronic device following the fall (e.g., how high the device bounces or otherwise responds to impacting a surface). The coefficient of restitution can indicate the nature of the surface impacted by the device during the fall. For instance, if the acceleration vector sum at 404 and 406 is lower or shows activity over a shorter duration, this may indicate that a softer surface, such as carpeting or a person, was contacted. On the other hand, if the acceleration vector sum at 404 and 406 is higher or shows activity over a longer duration, this may indicate that a harder surface was contacted, such as concrete or metal. Additionally, as indicated at 408, the acceleration vectors between 4800 milliseconds and 5800 milliseconds show a static electronic device after the fall event.

Accordingly, fall events such as freefall, projectile motion, and the like, may produce distinctive acceleration vector signatures that are distinguishable from other acceleration events induced on an electronic device 100. For example, an accelerometer readout during typical use, such as while playing a game, may produce an acceleration vector signature that is substantially different from the acceleration vector signature illustrated in the graph 400. Thus, the monitoring module 112 on the electronic device 100 may distinguish between the acceleration signature of a fall event and those of other acceleration events induced on the electronic device 100 to ensure that the monitoring module 112 does not record events that are not actual fall events. This can result in battery life savings and reduction in unnecessary processing activity. For example, the monitoring module 112 may check one or more thresholds for the acceleration components Ax, Ay and Az, and/or the acceleration vector Av for making a determination as to whether current motion of the electronic device is indicative of a fall. As one example, the electronic device 100 may include a trained model that that has been trained on acceleration characteristics of various different fall events, for quickly distinguishing between an actual fall event and other types of movement, such as playing a video game, walking, jogging, running, or the like. In some cases, the acceleration vector sum may be change by a threshold amount toward zero within a threshold amount of time, and still be somewhat greater than zero, while also indicating that the device is falling.

Furthermore, if the monitoring module 112 detects that the device is falling, the electronic device 100 may activate one or more protective measures or protective mechanisms on the electronic device 100. For example, the electronic device 100 may activate a bumper, protective armor, airbag or other deployable element or mechanism to cushion an impact of the electronic device 100 with a surface. Alternatively, the electronic device 100 may deploy one or more wings, a parachute, or other drag inducing deployable element or mechanism to slow the fall of the electronic device. In some examples, the electronic device may wait to deploy the protective mechanism until the electronic device detects that the fall height is predicted to be greater than a threshold height. For instance, if the fall duration exceeds a threshold, then the electronic device 100 may deploy the protective mechanism. Further, the collection and storage of sensor data may not necessarily be performed in some implementations when the protective mechanism is deployed. For example, the sensor data may be monitored to detect a fall event and when a fall is detected, the protective mechanism may be deployed.

Figure 5:
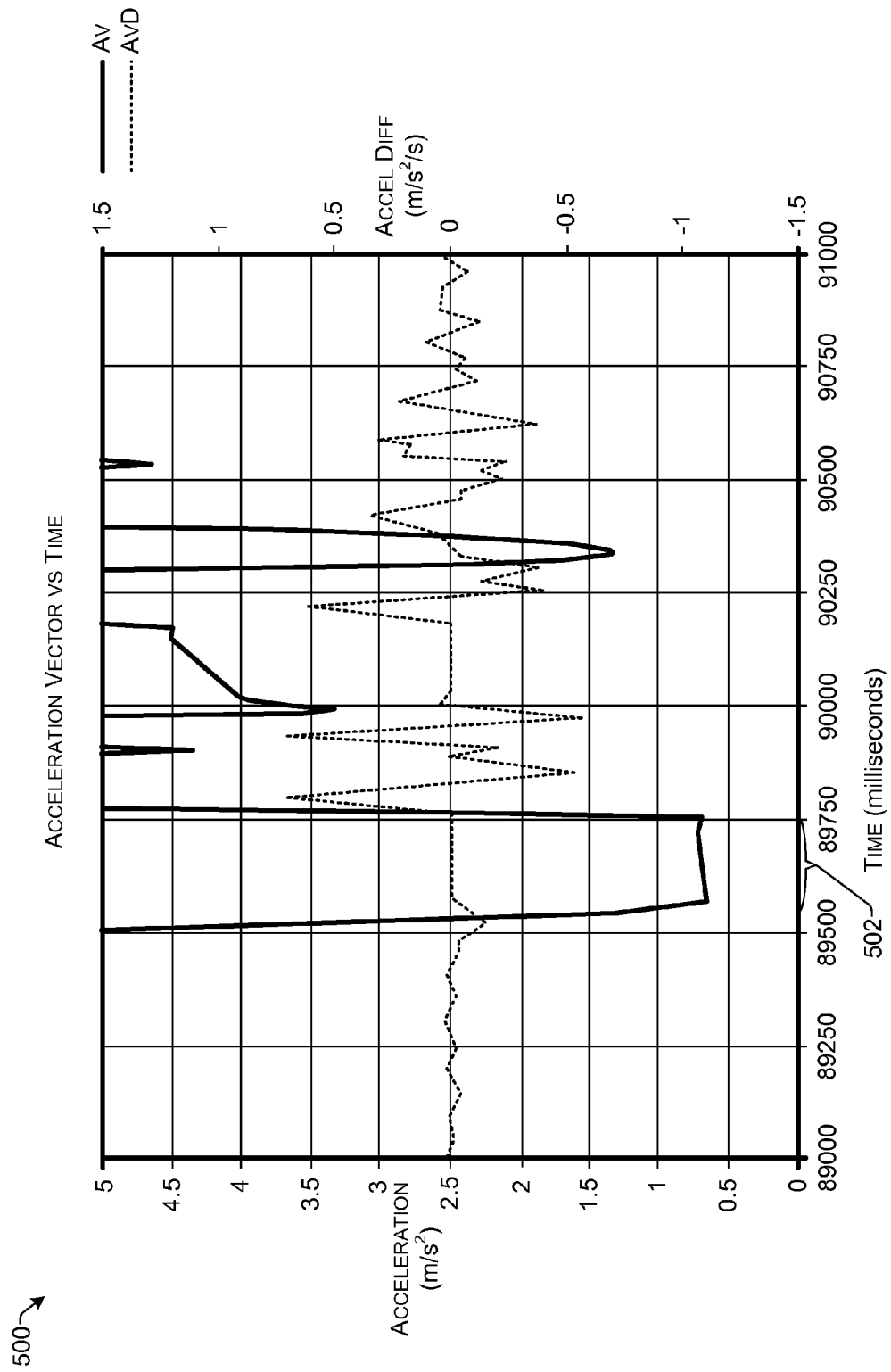
FIG. 5 is an example graph illustrating a magnified view of a fall event according to some implementations.

FIG. 5 is a graph 500 illustrating an example of acceleration data of a freefall drop at a higher magnification than the graph 400 of FIG. 4. In the graph 500, values of the acceleration vector Av are shown on the left vertical axis of the graph 500, and values of the acceleration vector differential AvD are shown on the right vertical axis of the graph 500. As indicated at 502, the acceleration vector Av tends toward zero between about 89500 and 89750 milliseconds. Furthermore, the acceleration vector differential AvD shows the change or differential of the acceleration vector over time. Accordingly, area 502 of the graph 500 indicates that a freefall event occurred between about 89500 and 89750 milliseconds. The acceleration vector differential AvD is indicative of acceleration toward freefall at the point of release (e.g., at about 89500 milliseconds) and further indicates the acceleration due to impact (e.g., at about 89750 milliseconds). For instance, between these times, a flat response (i.e., no differential) is illustrated when the electronic device reaches freefall.

Figure 6:
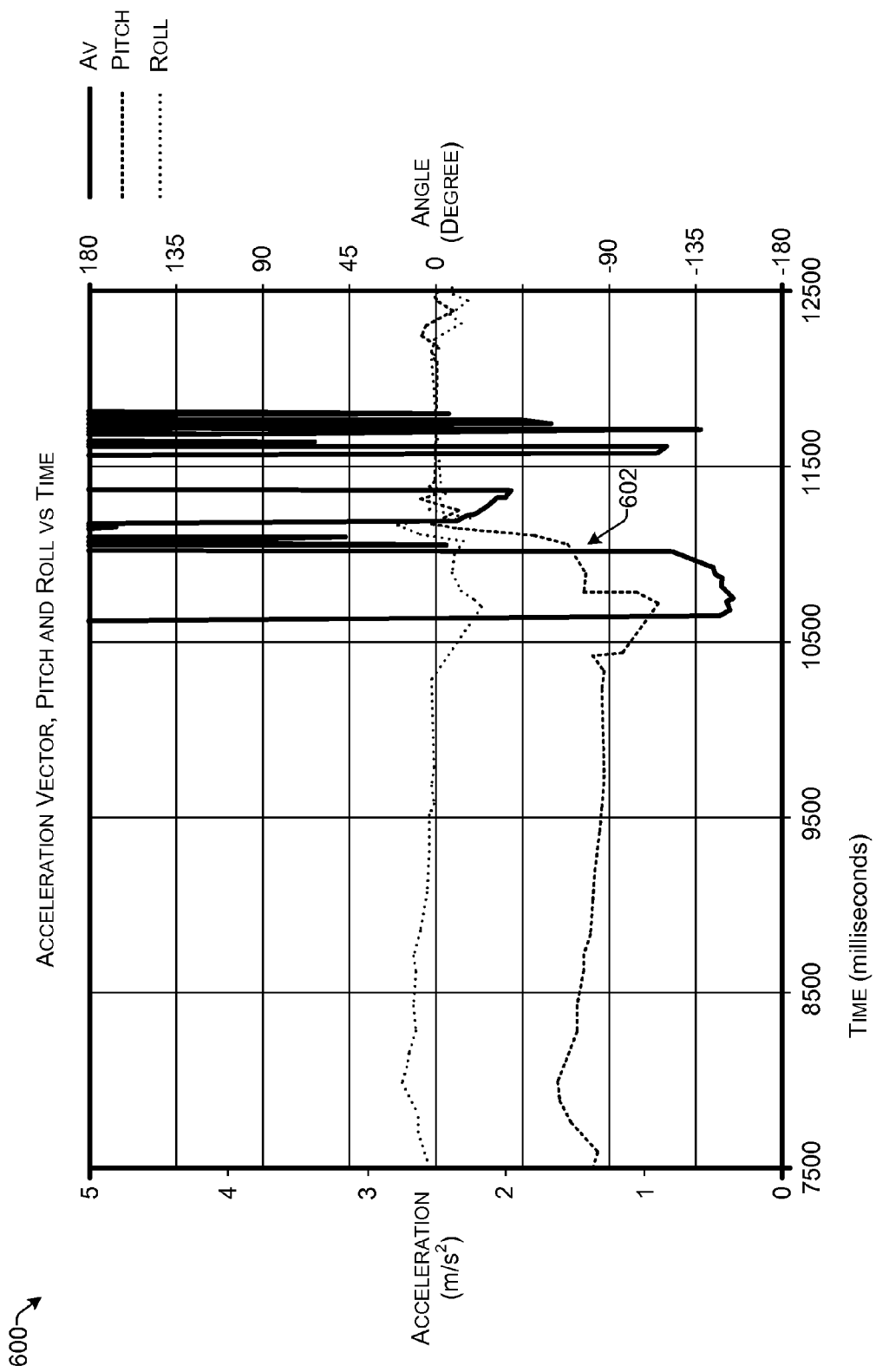
FIG. 6 is an example graph illustrating an acceleration vector, pitch angles and roll angles for a fall event according to some implementations.

FIG. 6 is an example graph 600 illustrating an acceleration vector, pitch angles and roll angles for a fall event according to some implementations. For example, before, during and after an electronic device 100 is in freefall, the sensors on the electronic device 100, such as a gyroscope, may be used to determine corresponding pitch, roll and/or yaw values to provide information that indicates the orientation of the electronic device 100, such as during impact with a surface. In the example of FIG. 6, values for the acceleration vector Av are plotted on the left vertical axis in m/s$^2$, angle values for pitch and roll are plotted on the right vertical axis, and time in milliseconds is plotted on the horizontal axis. Accordingly, as indicated at 602, at impact, the pitch angle of the electronic device 100 is approximately −70 degrees and the roll angle of the electronic device is approximately −15 degrees. The orientation of the electronic device at various other times during the fall event may also be determined from the graph 600.

Figure 7:
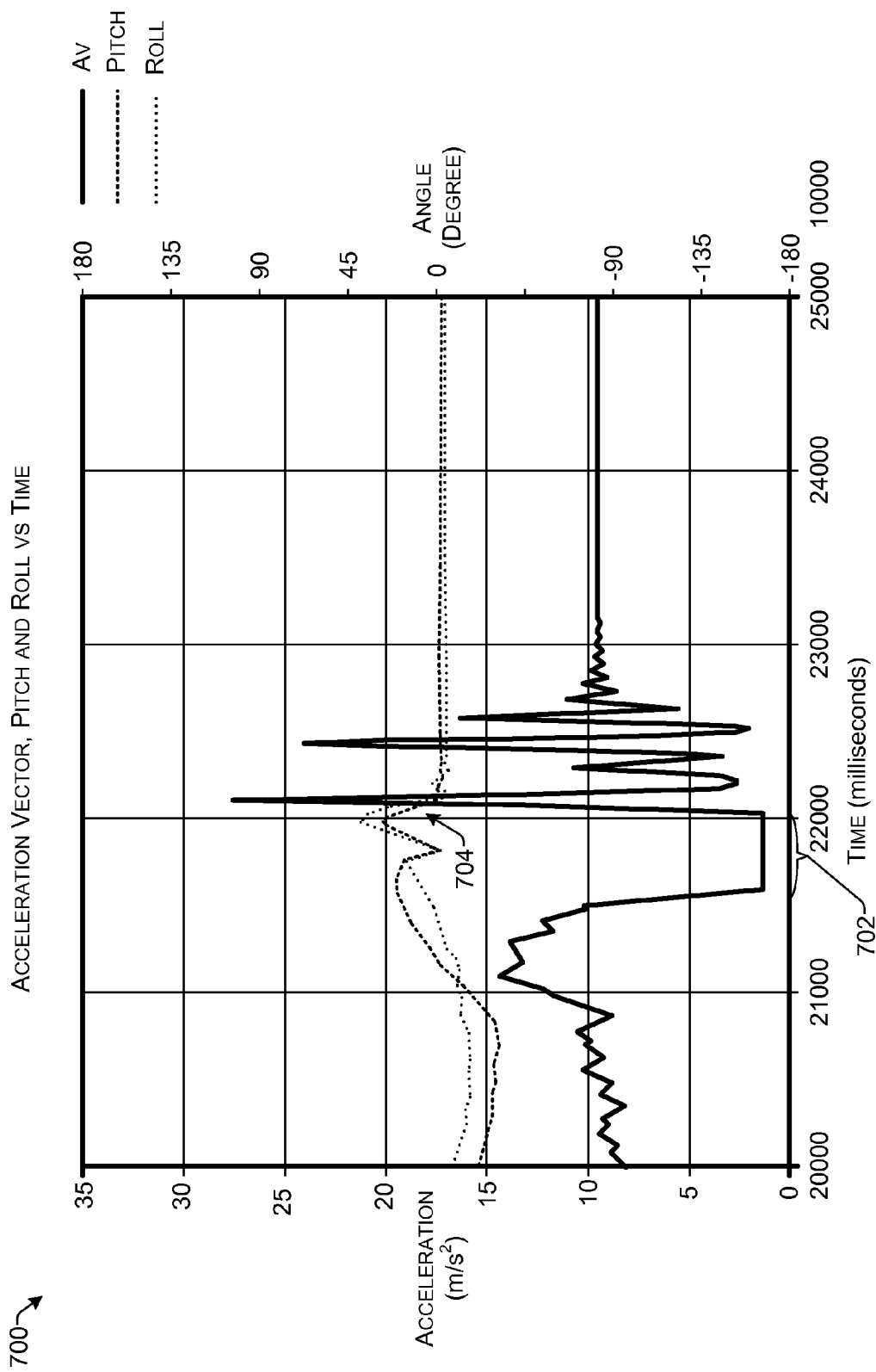
FIG. 7 is an example graph illustrating an acceleration vector, pitch angles and roll angles for a device in projectile motion according to some implementations.

FIG. 7 is an example graph 700 illustrating an acceleration vector, pitch angles and roll angles for an electronic device 100 in projectile motion according to some implementations. A horizontal trajectory, or a projectile, may be analyzed in the same manner as freefall. For instance, an electronic device thrown as a projectile may show and acceleration vector that exceeds 10 m/s$^2$ (e.g., between about 21000 and 21500 milliseconds), but will hit the ground at approximately the same time as an electronic device that is dropped vertically when the direction of projectile motion is horizontal. In the example of FIG. 7, values of the acceleration vector Av are plotted on the left vertical axis in m/s², angle values for pitch and roll are plotted on the right vertical axis, and time in milliseconds is plotted on the horizontal axis. Accordingly, as indicated at 702, the signature of a fall event that includes projectile motion may have an appearance that is similar to a vertical drop in some cases. Further, the orientation of the electronic device 100 at impact may be determined from the pitch and roll angles, as indicated at 704.

Furthermore, as mentioned above, the onboard sensors on a typical electronic device 100 are not sensitive enough to directly measure the magnitude of acceleration inflicted on the electronic device 100 due to impact following a fall. However, according to the implementations herein, the boundary conditions of the fall event such as orientation of the electronic device and estimated height of the fall can be measured and used to recreate the fall event in control environments and capture specific data based on coordinated simulation experiments.

For example, the monitoring module 112 may calculate the fall distance or height h of the fall based on the following formula:

$$h = u \cdot t + 0.5 \cdot a \cdot t^2 \quad \text{Equation (1)}$$

where h is the height along the global y-axis; u is the initial vertical velocity along the global y-axis; t is time (e.g., from the start of the fall event to the end of the fall event); and a is acceleration (e.g., due to gravity in some examples). Thus, assuming an initial velocity of 0 m/s in the y-axis direction and acceleration only due to gravity (9.81 m/s²), Equation (1) may be expressed as follows:

$$h = 0.5 \cdot g \cdot t^2 \quad \text{Equation (2)}$$

where g is acceleration due to gravity, e.g., 9.81 m/s² at sea level. Accordingly, based on Equation (2) and the known duration of freefall (e.g., when the acceleration vector Av goes toward zero, the height h can be estimated. Based on these equations, the theoretical duration of freefall events from certain heights are listed in Table 1.

TABLE 1

| | Height (mm) | | | | |
|---|---|---|---|---|---|
| | 1000 | 800 | 600 | 400 | 200 |
| Duration (msec) | 452 | 404 | 350 | 286 | 202 |

In some examples, a combination of the acceleration vector, and its differential signatures (e.g., where the differential is zero) is used to isolate and identify freefall events. Certain constants may be determined empirically to account for air resistance in different orientations, as well as to compensate for system lag in measurements taken by the sensors. When a freefall event has been identified, the parameters of the fall event may be calculated and/or stored for further analysis (such as duration of fall event, orientation of the electronic device, and so forth). In some examples, asynchronous sensor data may be handled using an independent time axis to estimate the closest orientation sensor readouts.

Figure 8A:
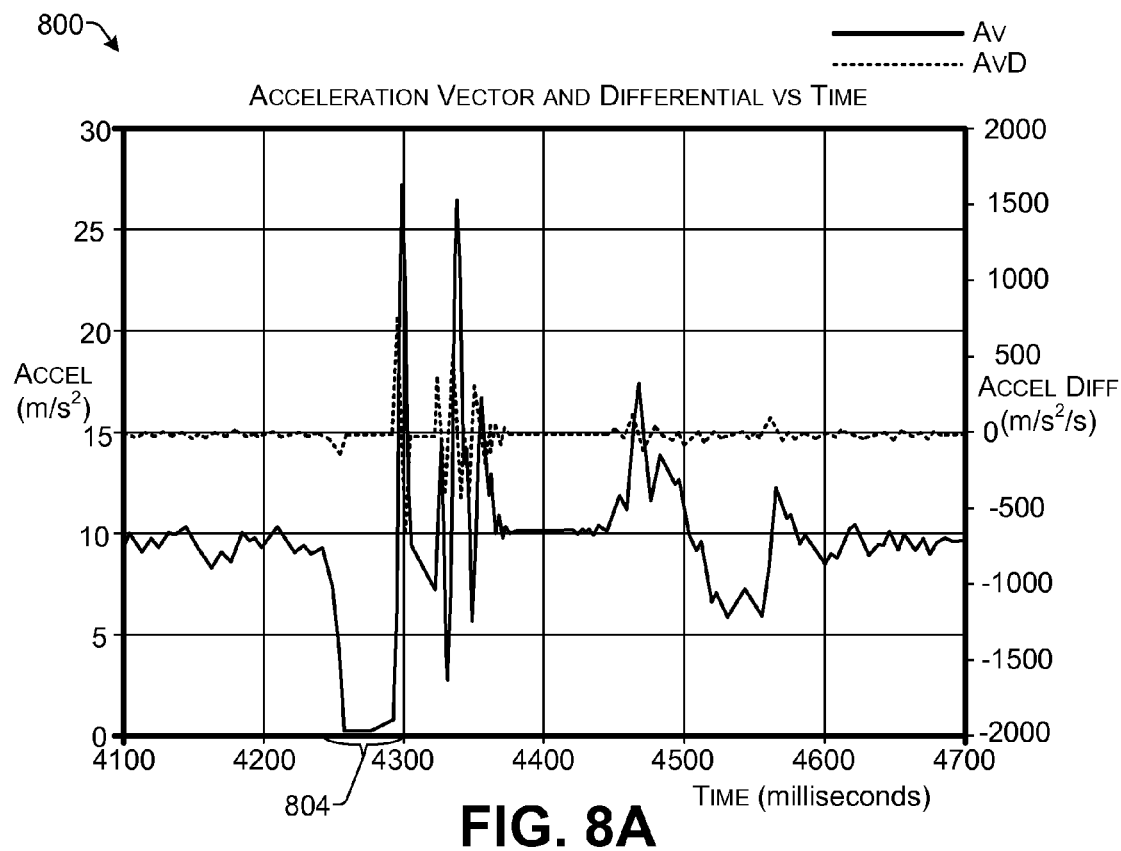
FIGS. 8A and 8B are example graphs illustrating freefall drops from two different heights according to some implementations.
Figure 8B:
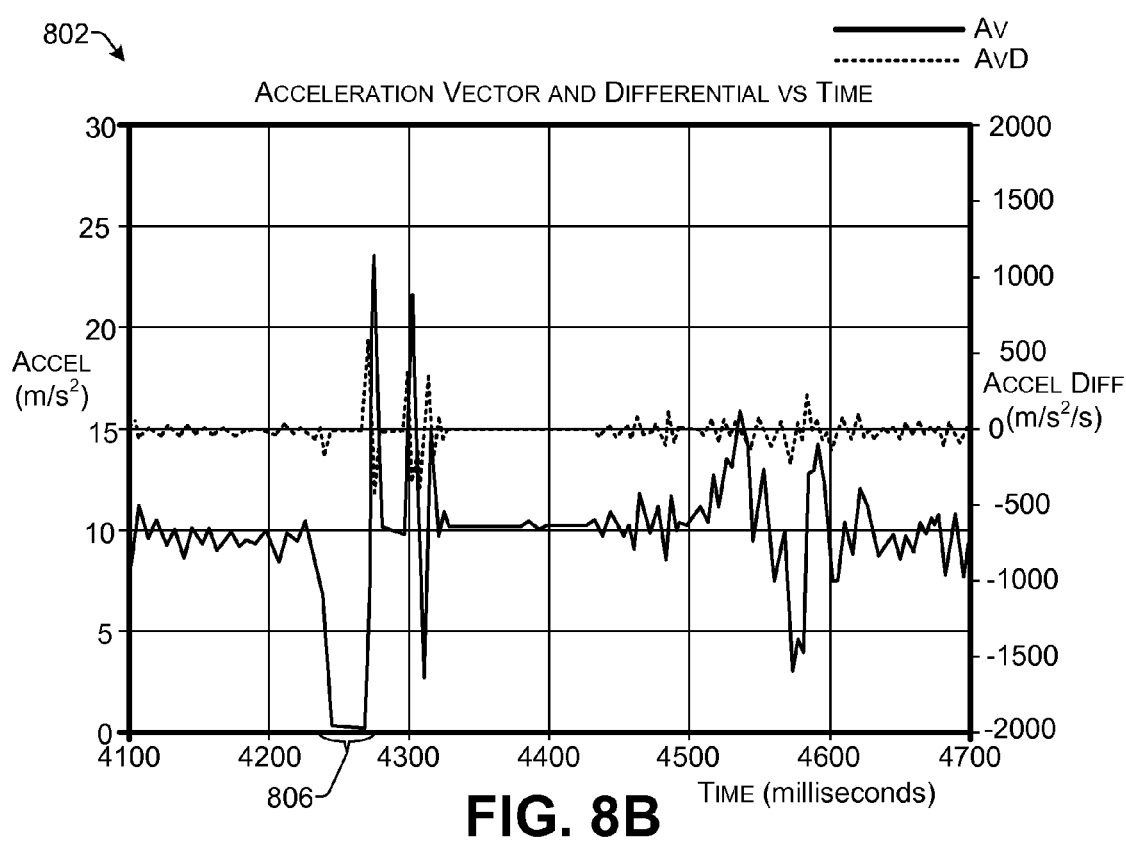

FIGS. 8A and 8B are graphs 800 and 802, respectively, illustrating examples of freefall drops from two different heights according to some implementations. For example, suppose that graph 800 corresponds to a 100 cm height h, while the graph 802 corresponds to a 60 cm height h. As indicated at 804 and 806 respectively, it may be seen for comparison purposes that the fall corresponding to 100 cm is of a longer duration than the fall event corresponding to 60 cm. Furthermore, the acceleration vector Av resulting from the impact is larger for the 100 cm fall event than for the 60 cm fall event.

FIG. 9 is a table 900 illustrating examples of durations of freefalls for different drop heights versus predicted drop heights determined according to some implementations. In this example, the actual drop height is indicated at 902, and the duration of the fall determined from the sensor data is indicated at 904, such as based on changes in the acceleration vector Av and the acceleration vector differential AvD, as discussed above. The predicted height h is indicated at 906, such as calculated based on Equation (2) discussed above. Further, the percent error between the actual height 902 and the predicted height 906 is indicated at 908. In the table 900, example data is provided for five different heights, namely 1000 mm, 800 mm, 600 mm, 400 mm and 200 mm, and for both an edge drop, as indicated at 910 and a face drop, as indicated at 912. For instance a face drop in which the electronic device 100 is dropped with the front side or back side facing toward the ground may be expected to have a higher drag than an edge drop in which one of the edges of the electronic device 100 is facing the ground. Table 900 further illustrates that the detection accuracy of freefall duration is a related to the sampling rate of the sensor (for example, the data of FIG. 900 may correspond to a sampling rate of 100 Hz), and hence longer freefall durations allow for more accurate predictions. In addition, drag varies with design and orientation, among other factors, and this also affects the duration of freefall and the corresponding error 908.

Figure 10:
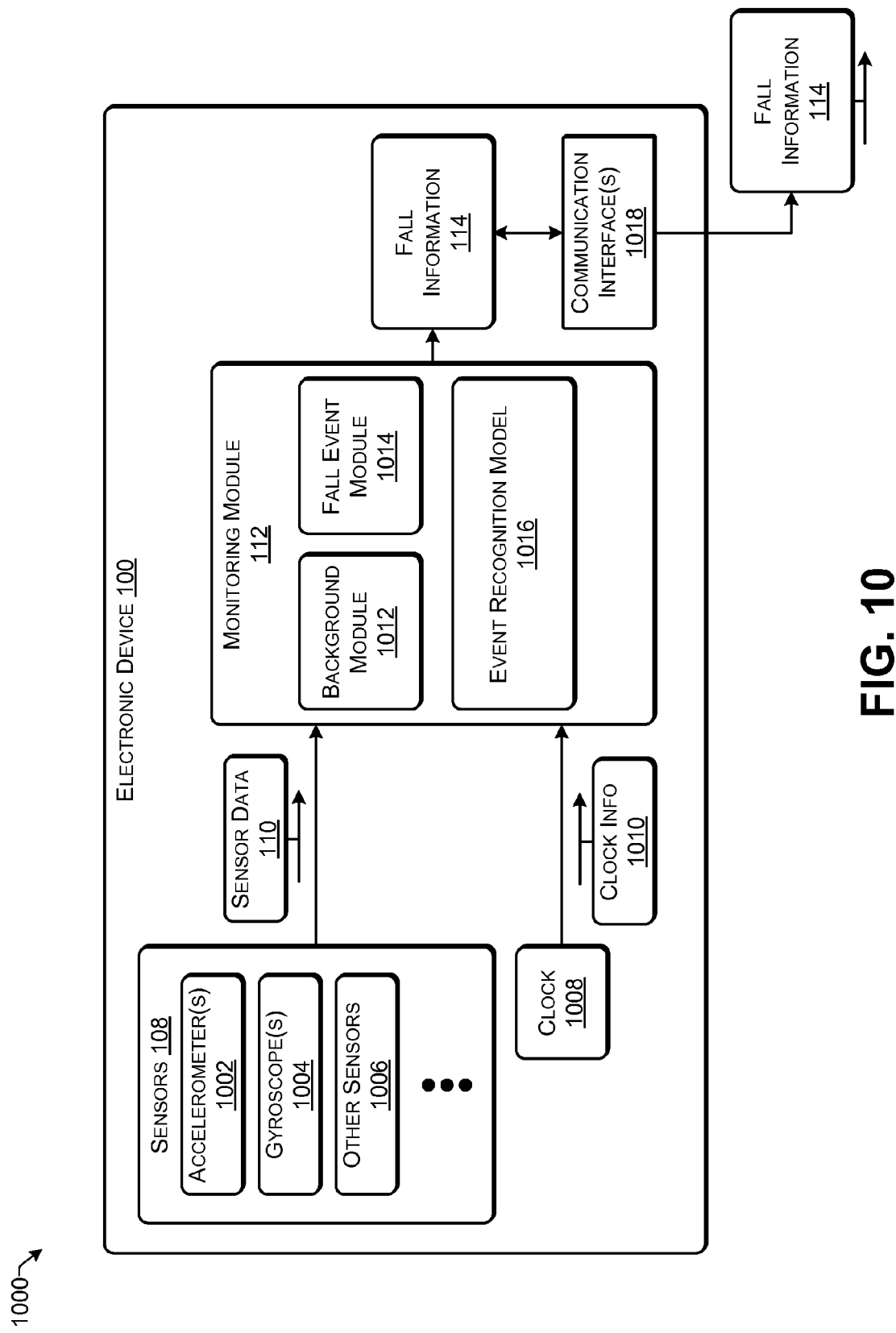
FIG. 10 illustrates an example framework for monitoring fall events on a portable device according to some implementations.

FIG. 10 illustrates an example framework for monitoring and characterizing fall events according to some implementations. In this example, the electronic device 100 includes the monitoring module 112 that may be executed on the electronic device 100. The monitoring module 112 may receive the sensor data 110 from the one or more sensors 108. For example, the monitoring module 112 may receive input from one or more accelerometers 1002, one or more gyroscopes 1004, and other sensors 1006. Examples of various other sensors, components or devices 1006 onboard the electronic device 100 that may be of use in the techniques herein may include a compass, a camera, a microphone, a sonar device, a temperature sensor, an infrared sensor, a pressure sensor, an airflow sensor, and the like. For example, when the electronic device 100 detects that it is falling, the electronic device 100 may activate the camera or the microphone to collect additional sensor data regarding the fall. In other examples, rather than relying on the accelerometer information and/or gyroscope information for detecting a fall, any of the other sensors 1006 may also be used for detecting that the electronic device 100 is falling or has fallen. For example, a microphone and camera may be used for fall detection based on changes in detected noise, camera point of view, and so forth. Accordingly, sensor data 110 from any combination of sensors 1002, 1004 and 1006 may be used for detecting and monitoring a fall in some implementations. Further, a clock 1008 may provide clock information 1010 to the monitoring module 112. For example, the clock 1002 may be included in a processor or may be any other suitable clock onboard the electronic device 100 for determining timing of various portions of a fall event. The timing information may be stored with and correlated to the sensor data 110.

In the illustrated example, the monitoring module 112 includes a background module 1012 and a fall event module 1014. For example, the background module 1012 may monitor the accelerometer 1002 and/or gyroscope 1004 for sensor data 110 indicative of the beginning of a fall event. The monitoring by the background module 1012 may take place as a background process that samples the sensors at a low sampling rate to conserve power on the electronic device 100.

The monitoring module 112 may include or may access an event recognition model 1016, which may be a trained statistical model that receives the sensor data 110 from the background module 1012, and that determines whether the electronic device 100 is in a condition that indicates the beginning of a fall event. For example, the event recognition model 1016 may recognize a portion of an acceleration vector signature that indicates the beginning of a fall event, such as the acceleration vector Av moving in a direction toward zero. Upon determining that a fall event has started, the background module 1012 may then activate the fall event module 1014, which may increase the sampling rate of the sensors 108 to a higher sampling rate to obtain a larger amount of sensor data during the fall event. In some examples, the monitoring module 112 may cause the sensors 108 to increase the sampling rate at which the sensors 108 obtain sensor data 110. For instance, the accelerometer 1002 and/or gyroscope 1004 may be operated to collect sensor data at a lower sampling rate (e.g., from 20-100 Hz) until an indication of a fall is detected, and then operated at higher sampling rates, e.g., (100-1000 Hz) after the indication of the fall is detected. Alternatively, such as in the case of sensors 108 that have a fixed or constant output rate, the sampling rate at which the sensor data 110 is collected and/or stored may be increased from the lower sampling rate to the higher sampling rate. For example, if an accelerometer has a constant output data rate of 400 Hz, the monitoring module 112 may sample this output at a lower sampling rate until determining that a fall event is occurring, and then sample the accelerometer output at a higher sampling rate during the fall event.

The fall event module 1014 may receive and store the sensor data 110 as a portion of the fall information 114. Consequently, should the electronic device 100 fail as a result of the fall, the sensor data 110 may still be stored up to the point of failure of the electronic device 100. Thus, in some cases, the sensor data 110 stored as part of the fall information 114 may be extracted during servicing of a failed electronic device to determine other parameters of the fall event, such as the fall height, device orientation, and the like. On the other hand, if the electronic device 100 survives the fall event, the fall event module 1014 may continue to collect the sensor data 110 at the high sampling rate until a determination is made that the fall event is over. In some examples, the fall event module 1014 may further calculate an estimated height of the fall correspond to the fall event, and/or an orientation of the electronic device 100 before, during and after the fall event, and may store these calculated parameters as part of the fall information 114.

In some examples, the electronic device may include at least one communication interface 1018. The communication interface 1018 may include one or more interfaces and hardware components for enabling communication with various other devices, such as other electronic devices 100 or other computing devices, such as directly or over a network. For example, the communication interface 1018 may facilitate communication through one or more of the Internet, cable networks, cellular networks, wireless networks (e.g., Wi-Fi, cellular) wired networks, direct wireless or wired connection, near-field communication, and so forth. Thus, the communication interface 1018 may be used to transmit fall information 114 to another device, a network, etc. In some cases, the monitoring module 112 may begin to send fall information 114 as soon as a fall is detected by the background module 1012. For instance, the transmitted fall information 114 may include the sensor data 110 collected and transmitted in real time as the electronic device 100 is falling. In other cases, the fall information 114 may be stored on the electronic device 100 and transmitted periodically or following the occurrence of a fall that meets one or more thresholds for transmitting the fall information 114.

As mentioned above, the event recognition model 1016 may be a trained statistical model that has been trained using a plurality of training samples, such as from a plurality of drop tests of electronic devices 100 at various different heights and orientations, to distinguish between acceleration vector signatures that are indicative of a fall and those that are not. Examples of suitable event recognition models or classifiers that may be used include logistic regression classifiers, support vector machines, quadratic classifiers, linear classifiers, kernel estimation classifiers, neural networks, Bayesian networks, hidden Markov models, decision tree classifiers, and so forth. Further, implementations are not limited to any particular type of event recognition model or classifier, and thus may employ any combination of algorithms, learning models, statistical models, feature vectors, and so forth.

Figure 11:
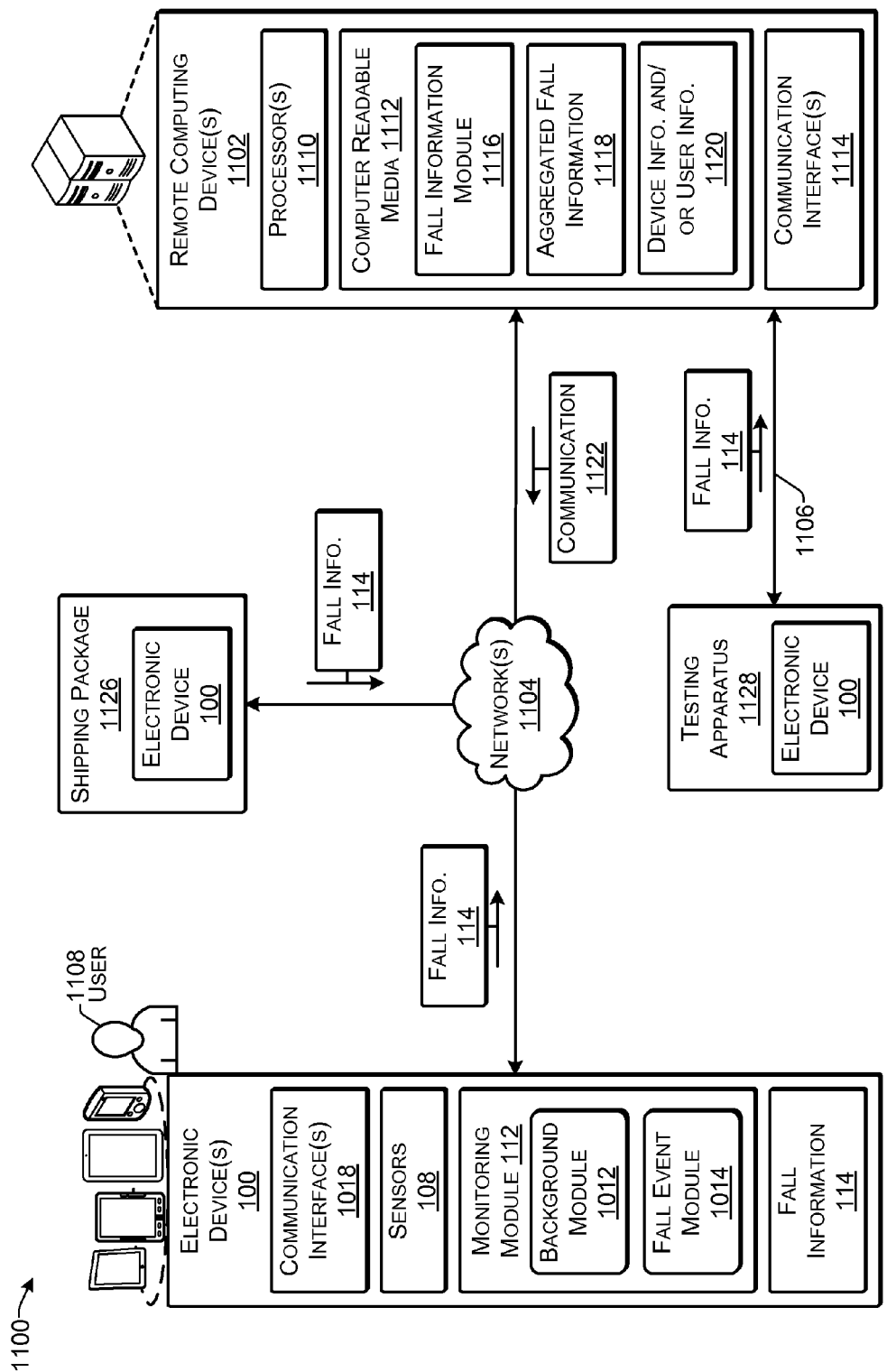
FIG. 11 illustrates an example architecture of a system for monitoring fall events according to some implementations.

FIG. 11 illustrates an example system 1100 that may be employed to provide fall information 114 from the electronic device 100 to one or more remote computing devices 1102 according to some implementations. For instance, in some examples, the electronic device 100 may automatically send the fall information 114 to the remote computing device 1102, such as over a network 1104, or through a direct connection 1106. The remote computing device 1102 may be provided by a service provider, such as an entity that provides, sells, or leases the electronic device 100 to a user 1108, or that provides content items or services to the electronic device 100 and the user 1108.

In the illustrated example, each remote computing device 1102 may include one or more processors 1110, one or more computer-readable media 1112, and one or more communication interfaces 1114. The processor(s) 1110 may be a single processing unit or a number of processing units, and may include single or multiple computing units or multiple processing cores. The processor(s) 1110 can be configured to fetch and execute computer-readable instructions stored in the computer-readable media 1112 or other computer-readable media.

The computer-readable media 1112 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 1102, the computer-readable media 1112 may be a type of computer-readable storage media and may include tangible non-transitory storage media.

The communication interface(s) 1114 may include one or more interfaces and hardware components for enabling communication with various other devices, such as the electronic device(s) 100 or other computing devices, over the network(s) 1104. For example, communication interface(s) 1104 may facilitate communication through one or more of the Internet, cable networks, cellular networks, wireless networks (e.g., Wi-Fi, cellular) and wired networks. For instance, the network(s) 1104 may include any suitable network, including an intranet, the Internet, a cellular network, a local area network (LAN), a wide area network (WAN), a virtual private network (VPN) or any other network or combination thereof. As several examples, the remote computing device 1102 and the electronic device 100 may communicate and interact with one another using any combination of suitable communication and networking protocols, such as Internet protocol (IP), transmission control protocol (TCP), hypertext transfer protocol (HTTP), cellular or radio communication protocols, and so forth.

In some examples, the remote computing device 1102 may include a fall information module 1116, which may receive fall information 114 from the electronic device(s) 100. For example, the fall information module 1116 may store the fall information 114 as aggregated fall information 1118. In some examples, the fall information module 1116 may associate particular fall information 114 with a particular electronic device 100 or with a particular user account, device account or other device and/or user information. For example, the remote computing device 1102 may maintain device information and/or user information 1120, which may include any of a device identifier, such as a device serial number, device account information, user account information and or any combination thereof. As one example, the remote computing device 1102 may receive fall information 114 from a particular electronic device 100 and may associate the received fall information 114 with a record maintained for the particular electronic device 100. For instance, if the fall information indicates that the electronic device has incurred one or more fall events that may compromise one or more components of the electronic device 100, the fall information module 1116 may send a communication 1122 to the electronic device, such as to recommend that the electronic device 100 be serviced or inspected by a technician.

The electronic device 100 may include the one or more communication interfaces 1018 that, in some implementations, may be of a similar configuration to the communication interfaces 1114 discussed above. Accordingly, the monitoring module 112 of the electronic device 100 may utilize the communication interface 1018 to send the fall information 114 to the remote computing device 1102 on a periodic basis. In other examples, the electronic device 100 may send the fall information 114 following the occurrence of a single fall event, or following the occurrence of a threshold number of fall events, such as five. In still other examples, the electronic device 100 may send the fall information 114 to the remote computing device 1102 following the occurrence of a fall event that exceeds a particular threshold such as a particular height threshold or fall duration. In still other examples, the electronic device 100 may send the fall information 114 to the remote computing device 1102 in response to receiving a communication 1122 from the remote computing device 1102. For example, the computing device 1102 may periodically poll the electronic device 100 or may send another type of communication requesting that any stored fall information 114 be sent to the remote computing device 1102.

In still other examples, the electronic device 100 may begin sending the fall information 114 as soon as a fall is detected by the monitoring module 112. As one example, when the background module 1012 determines that a fall is occurring, the fall event module 1014 may begin transmitting the sensor data 110 via the communication interface 1018. In some cases, the sensor data 110 may be constantly stored in a buffer for a period of time as the sensor data 110 is generated. Thus, the transmitted fall information 114 may include sensor data 110 collected before the start of the fall, in addition to sensor data 110 collected during the fall and after the fall. Further, the fall information 114 transmitted to the remote computing device 1102 may include sensor data 110 that is collected and transmitted in real time as the electronic device 100 is falling. Accordingly, the electronic device 100 may transmit the fall information 114 as the electronic device 100 is falling at least up to the point of impact. Further, the electronic device 100 may continue transmitting the fall information 114 following impact if the electronic device 100 survives the impact functionally intact. As still another example, the monitoring module 112 may begin transmitting fall information 114 prior to the fall, such as in the case of a drop test in which the electronic device 100 will be intentionally dropped for testing purposes, or the like. For instance, prior to the start of the test, the monitoring module 112 may receive a communication via the communication interface 1018 to begin transmitting the sensor data 110 as fall information 114, and the testing may then be performed.

In some examples herein, the user 1108 may have the option to turn off or turn on, install or uninstall, etc., the monitoring module 112 on the electronic device 100. Furthermore, in some cases, the user 1108 may be able to set preferences for the monitoring module 112, such as by setting a threshold for a predicted magnitude of a fall event that causes the monitoring module 112 to switch from operation of the background module 1012 to operation of the fall event module 1014. In other examples, the monitoring module 112 may be part of an operating system (not shown in FIG. 11) or other larger module that executes on the electronic device 100, and may be inaccessible to the user 1108 or may require authorization to access. In some examples, the fall information 114 is sent and/or received anonymously and is not attributable to a particular user 1108 or a particular electronic device 100. For example, the user 1108 may be provided an invitation to opt-in to have the monitoring module 112 active on the electronic device 100, such as for assisting in device improvement or for receiving a notification if servicing of the electronic device 100 is recommended. Further, the user 1108 may be able to select an option to have the fall information 114 sent anonymously. Numerous other variations will be apparent to those of skill in the art having the benefit of the disclosure herein.

Furthermore, implementations herein are not limited to detecting and characterizing fall events on electronic devices 100 that are in the possession of users 1108. For example, the techniques herein may be employed to monitor an electronic device 100 during shipping or testing. As one example, the electronic device 100 may be placed into a shipping package 1126, with the background process 1012 operational in a minimal power consumption mode to monitor for any fall events that may occur during shipping of the electronic device 100. For example, during shipping, if a fall event begins to occur, the background module 1012 may activate the fall event module 1014 to increase the sampling rate of the sensors 108 on the electronic device 100 to capture the fall event. Following capture of the fall event, the background module 1012 may resume operation at the minimal power consumption mode. In addition, in some examples, depending on the type of communication interfaces 1018 available on the electronic device 100, the electronic device 100 may communicate information regarding the fall event to the remote computing device 1102 while the electronic device 100 is still en route to a shipping destination. Depending on the severity of the fall event, the service provider may decide to ship a new electronic device 100 to replace the electronic device 100 that incurred the fall event. As another alternative, the electronic device 100 may inform a user 1108 that receives the electronic device 100 of the occurrence of the fall event during shipping, such as when the user first starts up the electronic device 100. For example, the electronic device 100 may present a message on the display of the electronic device 100 that informs the user 1108 or a retailer that a fall event occurred during shipping. For instance, the message may recommend that the user or retailer contact the service provider to obtain a replacement for the electronic device 100.

In addition, in some examples, the monitoring module 112 may monitor for falls that occur during assembly of the electronic device 100. For example, as long as an assembled portion of the electronic device 100 is sufficiently complete to have a processor to execute the monitoring module 112, a sensor 108, such as an accelerometer, a power source, such as a battery, and a memory to maintain the monitoring module 112 and receive sensor data, the monitoring module 112 may begin monitoring for falls. For example, the monitoring module 112 may monitor for falls that may damage the assembled portion of the electronic device 100 or that may affect the future function of the electronic device 100. Accordingly, the monitoring module 112 may be operated as a quality control tool to prevent electronic devices 100 that are damaged during assembly from being shipped to a consumer or retailer. Further, the time of the fall event may be stored with the fall information so that the circumstances of the fall event may be determined, such as having occurred during assembly, during shipping, and so forth.

Furthermore, in some examples, the techniques herein may be used for testing and/or verifying the accuracy of data obtained through use of a testing apparatus 1128. Numerous types of drop testers, tumble testers, and similar types of test apparatuses are used for testing electronic devices 100 during design and verification of the electronic devices 100. Consequently, the techniques herein may be used to check the accuracy of data obtained through use of these testing apparatuses and may serve as a redundant data collection technique. For example, testing technicians may receive the results of the test in near real time at any location, and are not limited to the vicinity of the test site. Furthermore, the techniques herein may be used independently of conventional drop test machines for testing and integrity verification of electronic devices 100. For instance, drop test apparatuses typically employ testing at fixed orientation's and heights; however, the techniques herein are not limited to any particular orientation or height of a testing apparatus for collecting fall event information. Thus, the techniques herein may reduce or eliminate the need for expensive testing apparatuses, high-speed cameras, and so forth.

In addition, the techniques herein may be used to test and verify consistency across a plurality of testing apparatuses 1128. For example, the sensor data from the electronic device may be used to compare the results of multiple testing apparatuses 1128 for calibrating the testing apparatuses to achieve consistent test results, and to ensure that the tester apparatuses can be used interchangeably. Various testing apparatuses such as drop testers, tumble testers, and the like, may be calibrated and made to provide consistent results based on the sensor data collected from electronic devices 100 tested using the testing apparatuses.

Figure 12:
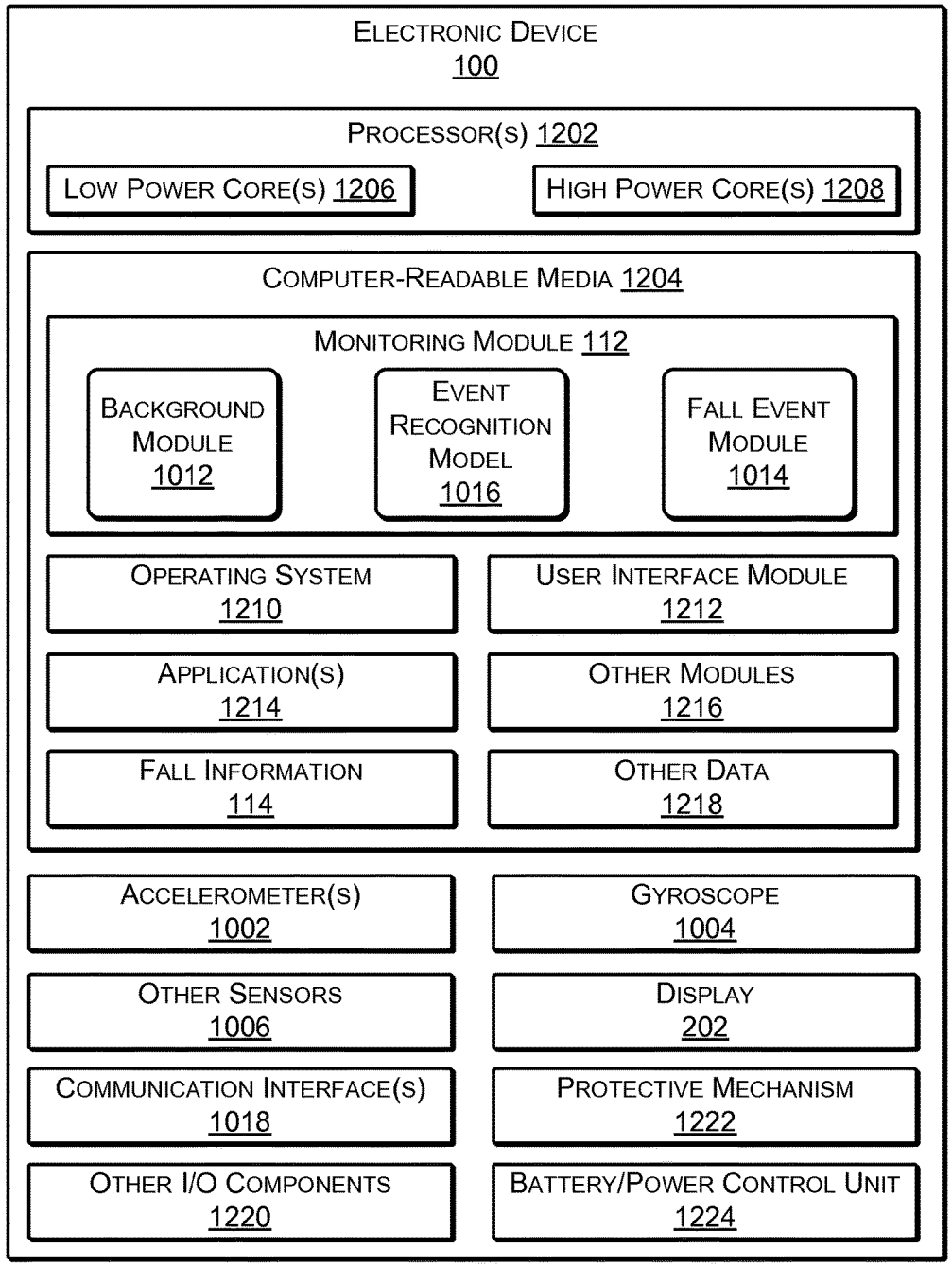
FIG. 12 illustrates an example portable device according to some implementations.

FIG. 12 illustrates select example components of the electronic device 100 that may be used to implement the techniques and functions described above according to some implementations. In a very basic configuration, the electronic device 100 includes, or accesses, components such as at least one control logic circuit, central processing unit, or processor 1202 and one or more computer-readable media 1204. Each processor 1202 may itself comprise one or more processors or processing cores. In the illustrated example, the processor 1202 may include one or more low power cores 1206 and one or more high power cores 1208. For instance, the monitoring module 112, or at least the background module 1012 thereof, may run in the background using the low power core 1206 until such a time as movement of the electronic device 100 and the other factors discussed above indicate that a fall event has begun. Some activities of the monitoring module 112 may then be performed by the high power core 1206, such as operation of the fall event module 1014 to receive sensor data at a higher sampling rate.

Depending on the configuration of the electronic device 100, the computer-readable media 1204 may be an example of tangible non-transitory computer storage media and may include volatile and nonvolatile memory and/or removable and non-removable media implemented in any type of technology for storage of information, such as computer-readable instructions, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the electronic device 100 may access external storage, such as RAID storage systems, storage arrays, network attached storage, storage area networks, cloud storage, or any other medium that can be used to store information and that can be accessed by the processor 1202 directly or through another computing device or network. Accordingly, the computer-readable media 1204 may be computer storage media able to store instructions, modules or components that may be executed by the processor 1202.

The computer-readable media 1204 may be used to store and maintain any number of functional components that are executable by the processor 1202. In some implementations, these functional components comprise instructions or programs that are executable by the processor 1202 and that, when executed, implement operational logic for performing the actions attributed above to the electronic device 100. Functional components of the electronic device 100 stored in the computer-readable media 1204 may include the monitoring module 112, executable by the processor 1202 for detecting movement of the electronic device 100 indicative of a fall event, as discussed above. Additional functional components stored in the computer-readable media 1204 may include the background module 1012, the event recognition model 1016, and the fall event module 1014, as described above, which may be part of the monitoring module 112 or separate therefrom. Furthermore, while the background module 1012, the event recognition model 1016 the fall event module 1014 and the monitoring module 112 are described separately herein for convenience of discussion, these may all be combined as a single piece of executable code or incorporated into a single computer program.

Other functional components may include an operating system 1210 and a user interface module 1212 for controlling and managing various functions of the electronic device 100 and providing basic functionality. Any or all of the modules 112, 1012 or 1014 and/or the event recognition model 1016 may be integrated into the operating system 1210, or alternatively, may be operable separately therefrom. Additionally, the computer-readable media 1204 may include one or more applications 1214, such as one or more mobile applications that may be executed to employ the electronic device 100 to perform various functions and uses, as well as other modules 1216 depending on the use and purpose of the electronic device 100.

In addition, the computer-readable media 1204 may also store data, data structures and the like, that are used by the functional components. For example, data stored by the computer-readable media 1204 may include the fall information 114 that is collected and/or calculated by the monitoring module 112. In some examples, the electronic device 100 may further various types of other data 1218 such as content items, user or device settings, which may control operation of the monitoring module 112, such as when the monitoring module 112 operates, data used by the monitoring module 112 or the event recognition model, data used by the operating system 1210, and data used by the applications 1214 or the other modules 1216 described above. Further, the electronic device 100 may include many other logical, programmatic and physical components, of which those described are merely examples that are related to the discussion herein.

FIG. 12 further illustrates the display 202, which may be passive, emissive or any other form of display, and may have a touch sensor associated therewith The electronic device 100 may further include various types of sensors, which may include the one or more accelerometers 1002, the one or more gyroscopes 1004 and other sensors 1006. In addition, the electronic device 100 may include various other types of other input/output (I/O) components 1220 such as various user controls (e.g., buttons, a joystick, a keyboard, a keypad, etc.), one or more speakers, a haptic or tactile output device, connection ports, and so forth. For example, the operating system 1210 of the electronic device 100 may include suitable drivers configured to accept input from a keypad, keyboard, or other user controls and devices included as the I/O components 1220. For instance, the user controls may include page turning buttons, navigational keys, a power on/off button, selection keys, and so on.

In addition, in some examples, the electronic device 100 may include one or more protective mechanisms 1222 that may be deployed when falling of the device is detected. For example, the one or more protective mechanisms 1222 may include at least one of a deployable element to slow the fall of the portable electronic device, or a deployable element to cushion an impact of the portable electronic device with a surface. Examples of the deployable elements are described above.

The one or more communication interfaces 1018 may support both wired and wireless connection to various networks, such as cellular networks, radio, WiFi networks, short-range or near-field networks (e.g., Bluetooth®), infrared signals, local area networks, wide area networks, the Internet, and so forth. The communication interfaces 1018 may further allow a user to access storage on another device, such as a remote computing device, a network attached storage device, cloud storage, a local computing device or the like. Additionally, the electronic device 100 may include a power source, such as a battery and power control unit 1224 for providing power to electronic device 100. Furthermore, the electronic device 100 may include various other components that are not shown, examples of which include removable storage, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 13:
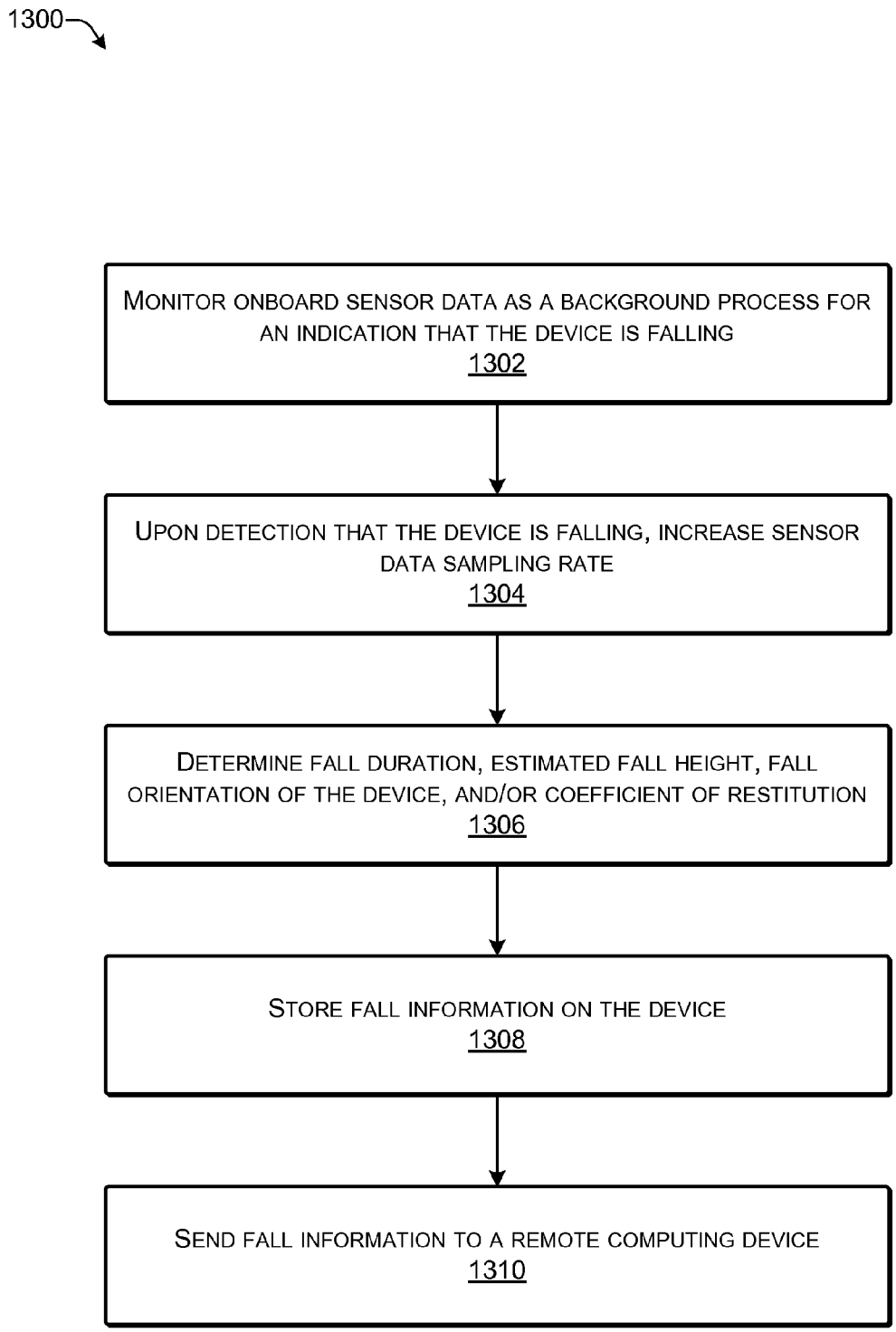
FIG. 13 is an example flow diagram of a process for monitoring fall events according to some implementations.
Figure 14:
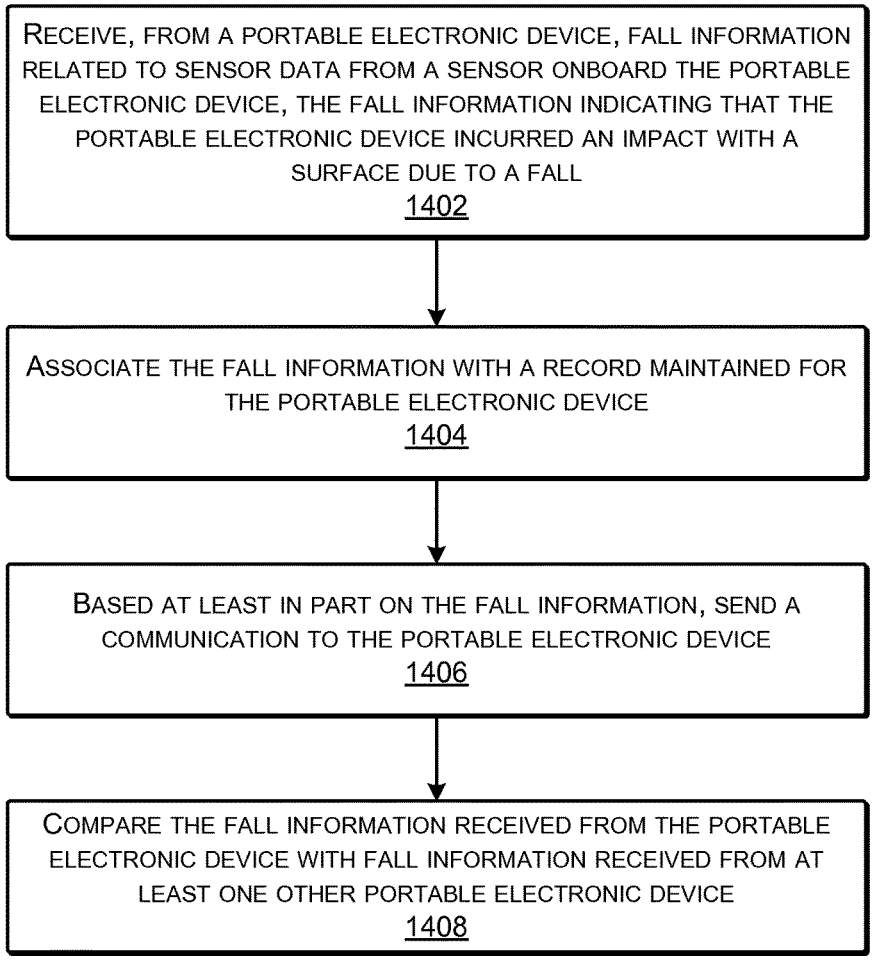
FIG. 14 is an example flow diagram of a process for monitoring fall events according to some implementations.

FIGS. 13 and 14 show illustrative processes for monitoring and characterizing fall events according to some implementations. The processes described herein may be implemented by the frameworks, architectures and systems described herein, or by other frameworks, architectures and systems. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. Further, not all of the blocks are executed in each implementation.

FIG. 13 is a flow diagram of a process 1300 for monitoring and/or characterizing a fall event according to some implementations. In some examples, the process 1300 may be executed, at least in part, by the monitoring module 112, as discussed above.

At 1302, the monitoring module may monitor onboard sensor data. For example, the monitoring module may include a background module that monitors the sensor data as a background process at a lower sampling rate to conserve power and processing resources on the electronic device.

At 1304, upon detection of a fall based at least in part on the sensor data, the monitoring module may increase the sensor data sampling rate. For example, the monitoring module may increase the sensor data sampling rate from a lower sampling rate to a higher sampling rate. As one example, in the case of an accelerometer, the operation frequency or sampling rate of the accelerometer may be increased to increase a sampling rate of the accelerometer from a lower sampling rate to a higher sampling rate. Alternatively, such as in the case of an accelerometer with a constant operation frequency, a polling or sampling of data from the accelerometer may be increased to increase a sampling rate of the accelerometer from a lower sampling rate to a higher sampling rate. Further, the monitoring module may detect that a fall has begun or is occurring based on the sensor data, such as based on a determination that the sensor data includes an acceleration vector signature that is indicative of freefall or projectile motion. For example, the acceleration vector may change and begin to move toward zero with a signature indicative of freefall, i.e., the acceleration vector sum for the x-axis, the y-axis and the z-axis may change toward zero by a threshold amount within a threshold time, such as moving rapidly toward zero over a short period of time as shown above with respect to FIGS. 4 and 5. Thus, the acceleration information may indicate that a fall has begun, such as discussed above with respect to FIG. 4. As a result, the portable electronic device may increase the sampling rate of the sensors to obtain additional sensor data during the remainder of the fall event, i.e., before impact, during impact and after impact with a surface.

At 1306, the monitoring module may determine a duration of the fall, an estimated height of the fall, an orientation of the device during the fall and/or a coefficient of restitution of the device following impact with a surface. For example, based on the characteristics of the acceleration vector or individual acceleration components, the monitoring module may determine the fall duration and the coefficient of restitution of the device in response to impact with a surface. Furthermore, the monitoring module may determine a height of the fall based on equations (1) and (2) discussed above. In addition, based at least in part on sensor data received from one or more gyroscopes, the monitoring module may determine an orientation of the device before during and/or after the fall, such as at a point of impact.

At 1308, the monitoring module may store in the fall event information on the device. For example, if the device survives the fall, the fall information may include the fall duration, fall height, device orientation and coefficient of restitution. On the other hand, if the device does not survive the fall, the fall information may include the sensor information obtained during the fall. As one example, at least the sensor information may be stored in a non-volatile memory such that the sensor information stored in the memory will survive failure of the device.

At 1310, the monitoring module may send the fall information to a remote computing device. For example, the monitoring module may send the fall information to a computing device that is separate from the electronic device, such as over one or more networks, or through a direct wired or wireless connection. The monitoring module may send the fall information on a per event basis, on a periodic basis, based on exceeding a fall parameter threshold, or any combination thereof.

FIG. 14 is a flow diagram of a process 1400 for monitoring fall events according to some implementations. In some examples, the process 1400 may be executed, at least in part, by the fall information module of the computing device 1102 discussed above.

At 1402, the fall information module may receive, from a portable electronic device, fall information based on sensor data from a sensor onboard the portable electronic device. For example, the fall information may indicate that the portable electronic device incurred an impact with a surface due to a fall.

At 1404, the fall information module may associate the fall information with a record maintained for the portable electronic device. For example, the fall information may be associated with an electronic device database that is maintained by a service provider for a plurality of the electronic devices. The service provider may track the falls that occur to the electronic devices, such as for determining whether service is recommended, determining if a warranty applies, determining causes of failure of the electronic devices, and so forth. In other examples, the record for the electronic device may also be associated with a user account, such as an account of an owner of the electronic device.

At 1406, based at least in part on the fall information, the fall information module may, send a communication to the portable electronic device. For example, the communication to the portable electronic device may recommend that the device be serviced or checked for damage. In some cases, the communication may not be sent unless one or more fall parameters, such as fall height, included in the fall information exceed a threshold for that parameter.

At 1408, the fall information module may compare the fall information received from the portable electronic device with fall information received from at least one other portable electronic device. For example, the fall information module may aggregate and compare the fall information from a plurality of devices to determine whether the devices are subject to failure at particular drop orientations, particular drop heights, or the like. As one example, the aggregated fall information may be used by engineers when optimizing the design of the electronic device.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A portable electronic device comprising:
    an accelerometer;
    one or more processors;
    one or more computer-readable media; and
    one or more modules maintained on the one or more computer-readable media which, when executed by the one or more processors, cause the one or more processors to perform operations that include:
        receiving acceleration information from the accelerometer, the acceleration information indicating an acceleration of the portable electronic device in at least one direction;
        determining, based at least in part on the acceleration information, that the portable electronic device is falling;
        increasing a sampling rate of the accelerometer from a lower sampling rate to a higher sampling rate to receive additional acceleration information from the accelerometer at the higher sampling rate;
        based at least in part on the acceleration information and the additional acceleration information, determining a fall duration;
        storing the fall duration; and
        sending, to a computing device, data related to a fall of the portable electronic device.

2. The portable electronic device as recited in claim 1, the operations further comprising determining, based at least in part on the fall duration, an estimated fall height.

3. The portable electronic device as recited in claim 1, further comprising a gyroscope, the operations further comprising:
    receiving orientation information from the gyroscope; and
    determining, based at least in part on the orientation information, an orientation of the portable electronic device, wherein the orientation indicates a part of the portable electronic device likely to have impacted a surface as a result of the portable electronic device falling.

4. The portable electronic device as recited in claim 1, wherein sending the data related to the fall comprises sending to the computing device at least one of:
the acceleration information;
the fall duration; or
an estimated fall height.

5. The portable electronic device as recited in claim 1, wherein the operation of determining that the portable electronic device is falling further comprises:
determining, from the acceleration information, changes over time in an acceleration vector sum for an x-axis, a y-axis and a z-axis of the portable electronic device; and
determining that the portable electronic device is falling when the acceleration vector sum for the x-axis, the y-axis and the z-axis changes toward zero by a threshold amount within a threshold time.

6. A method comprising:
receiving, by a processor of a portable electronic device, sensor data from a sensor included in the portable electronic device;
determining, based at least in part on the sensor data, that the portable electronic device is falling;
determining, from the sensor data, changes in an acceleration vector over time, the acceleration vector corresponding to acceleration along an x-axis, a y-axis and a z-axis of the portable electronic device;
determining a fall duration from a first time to a second time based at least in part on the changes in the acceleration vector;
storing the fall duration on the portable electronic device; and
sending, to a computing device, the fall duration.

7. The method as recited in claim 6, further comprising:
causing the sensor to increase a sampling rate from a lower sampling rate to a higher sampling rate; and
wherein the sensor data is sampled at the higher sampling rate.

8. The method as recited in claim 6,
the first time corresponds to a change in the acceleration vector sum, by a first threshold amount, toward zero; and
the second time corresponds to a change in the acceleration vector sum away from zero, by a second threshold amount, indicating the portable electronic device has impacted a surface.

9. The method as recited in claim 6, further comprising, determining, based at least in part on the fall duration, an estimated fall height.

10. The method as recited in claim 6, wherein the sensor data is monitored by a background process.

11. The method as recited in claim 6, further comprising determining, based at least in part on the change in the acceleration of the portable electronic device, a coefficient of restitution corresponding to the portable electronic device impacting a surface, wherein the surface is a surface of at least one of a ground, a floor or an object.

12. The method as recited in claim 6, wherein the sensor data further includes orientation information, the method further comprising:
determining at least one of:
an orientation of the portable electronic device during the falling;
an orientation of the portable electronic device associated with the portable electronic device impacting a surface; or
an orientation of the portable electronic device after the portable electronic device impacts the surface.

13. The method as recited in claim 6, wherein the portable electronic device is in a shipping container, the method further comprising sending fall information including at least one of the sensor data, a fall duration, or an estimated fall height to a remote computing device while the portable electronic device is in the shipping container.

14. The method as recited in claim 6, further comprising releasing the portable electronic device from a testing apparatus to cause the portable electronic device to fall.

15. The method as recited in claim 6, further comprising, in response to the determining the portable electronic device is falling, deploying a protective mechanism, wherein the protective mechanism comprises at least one of:
an element to slow the falling of the portable electronic device; or
an element to cushion an impact of the portable electronic device with a surface.

16. The method as recited in claim 6, wherein at least a portion of the sensor data and the fall duration is sent while the portable electronic device is falling.

17. A device comprising:
a sensor;
one or more processors;
one or more computer-readable media; and
one or more modules maintained on the one or more computer-readable media and executed by the one or more processors to perform operations comprising:
receiving, from the sensor, acceleration information of the device in at least one direction;
detecting a fall of the device based at least in part on the acceleration information;
determining, from sensor data received from the sensor, changes in an acceleration vector over time, the acceleration vector corresponding to acceleration along an x-axis, a y-axis and a z-axis;
determining a fall duration from a first time to a second time based at least in part on the changes in the acceleration vector; and
sending, to a computing device, at least one of: the acceleration information, the fall duration, or an estimated fall height.

18. The device as recited in claim 17, further comprising:
receiving orientation information; and
sending the orientation information to the computing device, wherein the orientation information indicates an orientation of the device during at least a portion of the fall.

19. The device as recited in claim 17, wherein the sending is performed in response to at least one of:
the detecting of the fall;
passage of a period of time;
the duration of the fall exceeding a fall duration threshold;
the estimated fall height exceeding a height threshold; or
receipt of a request from the computing device.

20. The device as recited in claim 17, wherein:
the acceleration information is received from an accelerometer onboard the device; and
the detecting the fall is based at least in part on the acceleration information meeting at least one acceleration threshold indicative of at least one of freefall or projectile motion.

21. The device as recited in claim 17, wherein the one or more modules maintained on the one or more computer-readable media when executed by the one or more processors, cause the one or more processor to perform additional operations comprising:
  causing the sensor to increase a sampling rate from a lower sampling rate to a higher sampling rate;
  receiving additional acceleration information from the sensor at the higher sampling rate; and
  determining the fall duration based at least in part on the acceleration information and the additional acceleration information.

\* \* \* \* \*